(12) United States Patent
Nachmanson et al.

(10) Patent No.: US 9,443,334 B2
(45) Date of Patent: Sep. 13, 2016

(54) ROUTING EDGES WITH ORDERED BUNDLES

(75) Inventors: Lev B. Nachmanson, Redmond, WA (US); Sergey Pupyrev, Ekaterinburg (RU); Sergey Bereg, Dallas, TX (US); Alexander E. Holroyd, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 885 days.

(21) Appl. No.: 13/101,162

(22) Filed: May 5, 2011

(65) Prior Publication Data
US 2012/0280999 A1 Nov. 8, 2012

(51) Int. Cl.
G06T 11/20 (2006.01)

(52) U.S. Cl.
CPC ................... *G06T 11/206* (2013.01)

(58) Field of Classification Search
CPC .............................................. G06F 17/30961
USPC ........................................................ 345/440
See application file for complete search history.

(56) References Cited

U.S. PATENT DOCUMENTS

| | | | |
|---|---|---|---|
| 4,953,106 A * | 8/1990 | Gansner | G06T 11/206 345/440 |
| 5,450,535 A | 9/1995 | North | |
| 6,239,813 B1 | 5/2001 | Erskine | |
| 6,781,599 B2 | 8/2004 | Abello et al. | |
| 6,892,371 B1 | 5/2005 | Teig et al. | |
| 8,933,937 B2 | 1/2015 | Nachmanson et al. | |
| 2005/0273746 A1 | 12/2005 | Malhotra et al. | |
| 2006/0290697 A1 | 12/2006 | Madden et al. | |
| 2007/0174019 A1* | 7/2007 | Vailaya | G06F 19/12 702/179 |
| 2008/0276201 A1 | 11/2008 | Risch et al. | |
| 2009/0097750 A1* | 4/2009 | Tamaru | 382/176 |
| 2010/0060642 A1 | 3/2010 | Chhaparwal et al. | |
| 2010/0060643 A1 | 3/2010 | Kolipaka et al. | |
| 2010/0182322 A1 | 7/2010 | Gansner et al. | |
| 2011/0181595 A1 | 7/2011 | Nachmanson et al. | |

OTHER PUBLICATIONS

Asquith et al. (An ILP for the metro-line crossing problem, 2008).*
Gansner et al. (Multilevel Agglomerative Edge Bundling for Visualizing Large Graphs, 2011, Mar., IEEE, pp. 187-194).*

(Continued)

*Primary Examiner* — Kyle Zhai
(74) *Attorney, Agent, or Firm* — Alin Corie; Sandy Swain; Micky Minhas

(57) ABSTRACT

A graph processing module is described for producing a processed graph in three phases. In a bundling phase, the graph processing module selects edges that are used to constitute paths to produce a bundled graph. In an ordering phase, the graph processing module orders paths within the bundled graph to produce an ordered bundled graph. In a separating phase, the graph processing module separates paths in the ordered bundled graph. Among other features, the graph processing module performs the selecting operation by minimizing a cost function; this has the effect of promoting bundling in the bundled graph while discouraging the presence of overly long edges in the bundled graph. The graph processing module can perform the ordering operation by selecting the ordering of paths passing through each edge based on a consideration of ordering constraints within a common subpath associated with the edge.

20 Claims, 15 Drawing Sheets

(56) References Cited

OTHER PUBLICATIONS

Doslic et al. (Vertex-Weighted Wiener Polynomials for Composite Graphs, ARS Mathematica Contemporanea 1 (2008) 66-80).*
Lambert, et al., "Winding Roads: Routing edges into bundles," retrieved at http://hal.archives-ouvertes.fr/docs/00/49/52/79/PDF/Winding_Roads_Eurovis2010.pdf>>, Proceedings of the Eurographics/IEEE-VGTC Symposium on Visualization, vol. 29, No. 3, 2010, 10 pages.
Lambert, et al., "3D Edge Bundling for Geographical Data Visualization," retrieved at http://hal.archives-ouvertes.fr/docs/00/49/53/07/PDF/3d_Edge_Bundling_IV10.pdf>>, Proceedings of the 14th International Conference on Information Visualization, 2010, 8 pages.
Lambert, et al., "Living flows: enhanced exploration of edge-bundled graphs based on GPU-intensive edge rendering," retrieved at <<http://hal.archives-ouvertes.fr/docs/00/49/52/93/PDF/Living_flows_IV10.pdf>>, Proceedings of the 2010 14th International Conference on Information Visualization, 2010, 8 pages.
Nachmanson, Lev B., "Ordered Bundles," retrieved at http://research.microsoft.com/en-us/um/people/levnach/orderedBundles.aspx>>, Microsoft Research, Microsoft Corporation, Redmond, WA, retrieved on Nov. 2, 2010, 3 pages.
Cui, et al., "Geometry-Based Edge Clustering for Graph Visualization," retrieved at <<http://www.cs.ust.hk/~zhouhong/articles/infovis08_weiwei.pdf>>, IEEE Transactions on Visualization and Computer Graphics, vol. 14, Issue 6, Nov. 2008, 8 pages.
Holten, et al., "Force-Directed Edge Bundling for Graph Visualization," retrieved at <<http://www.win.tue.nl/~dholten/papers/forcebundles_eurovis.pdf>>, Proceedings of the Eurographics/IEEE-VGTC Symposium on Visualization, vol. 28, Issue 3, 2009, 8 pages.
Argyriou, et al., "Two Polynomial Time Algorithms for the Metro-Line Crossing Minimization Problem," retrieved at <<www.math.ntua.gr/~mikebekos/pubs/GD2008.pdf>>, Proceedings of the 16th International Symposium on Graph Drawing, 2008, 15 pages.
Bekos, et al., "Line Crossing Minimization on Metro Maps," retrieved at <<http://www.math.ntua.gr/~mikebekos/pubs/GD2007.pdf>>, In Proceedings of the 15th International Symposium on Graph Drawing, 2007, pp. 231-242.
Dickerson, "Confluent Drawings: Visualizing Non-planar Diagrams in a Planar Way," retrieved at <<www.cs.brown.edu/sites/jgaa/accepted/2005/Dickerson+2005.9.1.pdf>>, Journal of Graph Algorithms and Applications, vol. 9, No. 1, 2005, pp. 31-52.
Duncan et al., "Drawing with Fat Edges," retrieved at <<http://www.cs.arizona.edu/~kobourov/fatedges.pdf>>, Proceedings of the 9th International Symposium on Graph Drawing, 2001, 16 pages.
Dwyer, et al., "Fast Edge-routing for Large Graphs," retrieved at <<http://research.microsoft.com/pubs/81239/routing.pdf>>, Proceedings of the 17th International Symposium on Graph Drawing, 2009, 15 pages.
Eppstein, et al., "Confluent Layered Drawings," retrieved at http://www.ics.uci.edu/~goodrich/pubs/conflayer.pdf>>, GD 2004 LNCS 3383, Springer-Verlag Berlin Heidelberg, 2004, pp. 184-194.
Gansner, et al., "Improved Circular Layouts," retrieved at <http://www.graphviz.org/Documentation/GK06.pdf>, In Proceedings of the 14th International Symposium on Graph Drawing, 2006, 12 pages.
Holten, Danny, "Hierarchical Edge Bundles: Visualization of Adjacency Relations in Hierarchical Data," retrieved at <<http://www.win.tue.nl/~dholten/papers/bundles_infovis.pdf>>, Eurographics IEEE-VGTC Symposium on Visualization, No. 28, No. 3, 2009, 8 pages.
Newbery, Frances J., "Edge Concentration: A Method for Clustering Directed Graphics," Proceedings of the 2nd International Workshop on Software Configuration Management, 1989, pp. 76-85.
Nollenburg, Marten, "An Improved Algorithm for the Metro-line Crossing Minimization Problem," retrieved at <<http://i11www.iti.uni-karlsruhe.de/extra/publications/n-iamlc-10.pdf>>, Proceedings of the 17th International Symposium on Graph Drawing, 2010, 12 pages.
Phan et al., "Flow Map Layout," retrieved at <<http://graphics.stanford.edu/papers/flow_map_layout/flow_map_layout.pdf>> Proceedings of the 2005 IEEE Symposium on Information Visualization, 2005, 6 pages.
Pupyrev, et al., "Improving Layered Graph Layouts with Edge Bundling," retrieved at <<http://sites.google.com/site/spupyrev/publications>> Proceedings of the 18th International Symposium on Graph Drawing, 2010, 12 pages.
Telea, et al., Image-based Edge Bundles: Simplified Visualization of Large Graphs, retrieved at <<http://www.cs.rug.nl/~alext/PAPERS/EuroVis10/paper.pdf>>, Eurographics IEEE-VGTC Symposium on Visualization, vol. 29, No. 3, 2010, 10 pages.
Wein, et al., "The Visibility-voronoi Complex and its Applications," retrieved at <<www.cs.unc.edu/~berg/EWCG2005.pdf>>, EWCG 2005, Eindhoven, Mar. 2005, pp. 151-154.
Wybrow, et al., "Orthogonal Connector Routing," retrieved at <<http://www.csse.monash.edu.au/~marriott/WybMarStu09.pdf>>, In Proceedings of the 17th International Symposium on Graph Drawing, 2009, 12 pages.
Lai, Wei, "Layout Adjustment and Boundary Detection for a Diagram," retrieved at <<http://ieeexplore.ieee.org/stamp/stamp.jsp?arnumber=00934697>>, Proceedings of the International Conference on Computer Graphics, 2001, pp. 351-354.
Eades, et al., "Straight-Line Drawing Algorithms for Hierarchical Graphs and Clustered Graphs," retrieved at <<http://www.cs.uoi.gr/~fpechliv/master/Related%20Work/About%20Graphs/Algorithmica.pdf>>, Algorithmica, No. 44, 2006, pp. 1-32.
"Diagram Edges 1.0 Requirements Specification," retrieved at <<http://software.topcoder.com/catalog/document?id=24670944>>, TopCoder Software, Inc., Glastonbury, Connecticut, 2002, 4 pages.
Eades, et al., "How to Draw a Directed Graph," Journal of Information Processing, vol. 13, No. 4, 1990, pp. 424-437.
Eades, et al., "Edge Crossings in Drawings of Bipartite Graphs," Algorithmica, vol. 11, No. 4, 1994, pp. 379-403.
"Model-based Testing with SpecExplorer," project page, retrieved at <<http://research.microsoft.com/en-us/projects/specexplorer/>>, retrieved on Jun. 13, 2011, Microsoft Corporation, Redmond, WA, 3 pages.
Eiglsperger, et al., "An Efficient Implementation of Sugiyama's Algorithm for Layered Graph Drawing," retrieved at <<http://www.emis.de/journals/JGAA/accepted/2005/EiglspergerSiebenhallerKaufmann2005.9.3.pdf>> Journal of Graph Algorithms and Applications, vol. 9, No. 3, 2005, pp. 305-325, 2005, 21 pages.
Ellis, et al., "A Taxonomy of Clutter Reduction for Information Visualization," retrieved at <<http://eprints.comp.lancs.ac.uk/1434/1/Ellis_%26_Dix_clutter_reduction_taxonomy_5.3.pdf>>, IEEE Transactions on Visualization and Computer Graphics, vol. 13, No. 6, 2007, 8 pages.
Lancichinetti, et al., "Benchmark Graphs for Testing Community Detection Algorithms," retrieved at <<http://filrad.homelinux.org/Mypapers/pre78_046110_2008.pdf>>, Physical Review E, vol. 80, No. 1, 2008, 5 pages.
Nachmanson, et al., "Drawing Graphs with GLEE," retrieved at <<http://research.microsoft.com/pubs/64284/gd2007-glee.pdf>>, Proceedings of the 15th International Symposium on Graph Drawing, GD 2007, LNCS 4875, 2007, 6 pages.
Tufte, Edward, R., "The Visual Display of Quantitative Information," abstract provided by Amazon.com, retrieved at <<http://www.amazon.com/Visual-Display-Quantitative-Information-2nd/dp/0961392142/ref=sr_1_1?ie=UTF8&s=books&qid=1263342059&sr=1-1#noop>>, retrieved on Jun. 13, 2011, Graphics Press, Cheshire, Connecticut, 1983, 6 pages.
"Layered Graph Drawing (Sugimura Method)," retrieved on Jan. 11, 2010, 48 pages.
Van Dalen, et al., "On Automated Graph Layout: An Algorithmic and Declarative Approach Designed and Implemented in the Functionality System Clarity," retrieved at <<http://userweb.port.ac.uk/~addist/Layout.pdf>>, Jun. 2001, 27 pages.

(56) References Cited

OTHER PUBLICATIONS

Sim, Susan, "Automatic Graph Drawing Algorithms," retrieved at <<www.ics.uci.edu/~ses/papers/grafdraw.ps>>, Dec. 17, 1996, 16 pages.

Gansner, et al., "A Technique for Drawing Directed Graphs," retrieved at <<http://www.graphviz.org/Documentation/TSE93.pdf>>, IEEE Transactions on Software Engineering, vol. 19, No. 3, 1993, 33 pages.

Office Action mailed Feb. 15, 2013 for U.S. Appl. No. 12/691,737, filed Jan. 22, 2010, 12 pages.

Response filed May 15, 2013, in response to Office Action mailed Feb. 15, 2013 for U.S. Appl. No. 12/691,737, filed Jan. 22, 2010, 13 pages.

Office Action mailed Jun. 26, 2013 for U.S. Appl. No. 12/691,737, filed Jan. 22, 2010, 14 pages.

Response filed Oct. 28, 2013, in response to Office Action mailed Jun. 26, 2013 for U.S. Appl. No. 12/691,737, filed Jan. 22, 2010, 16 pages.

Office Action mailed Dec. 2, 2013 for U.S. Appl. No. 12/691,737, filed Jan. 22, 2010, 16 pages.

Response filed May 2, 2014, in response to Office Action mailed Dec. 2, 2013 for U.S. Appl. No. 12/691,737, filed Jan. 22, 2010, 14 pages.

Notice of Allowance mailed May 23, 2014 for U.S. Appl. No. 12/691,737, filed Jan. 22, 2010, 9 pages.

Holten, Danny, "Hierarchical Edge Bundles: Visualization of Adjacency Relations in Hierarchical Data", IEEE Transactions on Visualization and Computer Graphics (Proc. of INFOVIS'06), vol. 12, No. 5, Sep./Oct. 2006, pp. 741-748.

Notice of Allowance mailed Sep. 10, 2014 for U.S. Appl. No. 12/691,737, filed Jan. 22, 2010, 7 pages.

\* cited by examiner

ROUTING EDGES WITH ORDERED BUNDLES

BACKGROUND

Many data sets can be represented in the form of a graph, namely, as a collection of entities connected together by relationships. A user may wish to provide a visual rendering of the graph to gain a better understanding of patterns, trends and other features in the data. Traditionally, the user has performed this task by representing the graph as a collection of node objects (associated with the entities) that are connected together by lines (associated with the relationships). This approach, however, can produce complex and confusing visual renderings for larger data sets.

Various techniques have been proposed to manage the complexity of such visual representations of graphs. According to one recent technique, a bundling mechanism can be used to group together lines within a graph that run close together. This improves the aesthetic appearance of the resultant graph and makes the graph easier to understand. Yet there is room for improvement in known bundling techniques.

SUMMARY

A graph processing module is described for providing an improved visual rendering of graph data. The graph processing module begins by receiving an original graph that expresses a set of nodes and a set of relationships among respective pairs of nodes. The graph processing module then operates on the original graph in three phases to produce a processed graph, where the processed graph includes paths which express the relationships in the original graph. The three phases comprise an edge bundling phase, an edge ordering phase, and edge separation phase.

In the edge bundling phase, the graph processing module selects edges to construct the paths, so as to produce a bundled graph. The graph processing module performs the selecting operation by minimizing a cost function. The cost function, in turn, specifies an ink component which influences an extent of bundling that is produced in the bundled graph, and a summed-path component which influences lengths of the paths in the bundled graph. As a net result, the selecting operation achieves a desired degree of bundling while, at the same time, discourages the use of overly long paths.

In the edge ordering phase, the graph processing module orders edges in the bundled graph to produce an ordered bundled graph. In the edge separation phase, the graph processing module separates edges in the ordered bundled graph to produce the processed graph.

According to another illustrative aspect, the graph processing module performs the selecting operation on a path-by-path basis.

According to another illustrative aspect, the graph processing module performs the selecting operation by first establishing a candidate-edge graph which provides a plurality of vertices that define a plurality of candidate edges. In one implementation, for instance, the candidate-edge graph is a visibility graph, e.g., a sparse visibility graph. The selecting operation then comprises selecting candidate edges in the candidate-edge graph to construct the paths in the bundled graph.

According to another illustrative aspect, the graph processing module incrementally adjusts positions of vertices in the bundled graph to straighten paths in the bundled graph.

According to another illustrative aspect, the graph processing module performs the ordering operation on an edge-by-edge basis, defining, for each edge, the ordering of paths. For each edge, the graph processing module can perform this operation by following a common subpath (to which the edge belongs) to detect a constraint which defines the ordering. That constraint may be either a juncture at which a prior-established ordering has been defined or a juncture at which the paths diverge from each other. Overall, the ordering operation reduces path intersections in final processed graph.

According to another illustrative aspect, the graph processing module performs the separating operation by defining hubs at respective vertices in the ordered bundled graph. A radius of each hub is defined based on one or more of: (a) obstructions to be avoided in the ordered bundled graph; (b) a minimum permitted separation between connected hubs; and (c) a manner in which edge bundles impinge the hub.

According to another illustrative aspect, the graph processing module performs the separating operation by drawing at least one parameterized curved-line segment within each hub. The graph processing module connects at least one linear segment to said at least one curved-line segment.

According to another illustrative aspect, the graph processing module performs the separating operation by adjusting at least one curved-line segment in the hub if said at least one curved-line segment is not separated from a neighboring curved-line segment within the hub by a predetermined minimum separation.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of an illustrative graph processing module for producing a processed graph containing ordered edge bundles. The graph processing module operates in three phases, comprising an edge bundling phase, an edge ordering phase, and an edge separating phase. Section B provides additional details regarding the edge bundling phase. Section C provides additional details regarding the edge ordering phase. Section D provides additional details regarding the edge separating phase. Section E describes illustrative processing functionality that can be used to implement any aspect of the features described in Sections A-D.

This Application is related to U.S. Ser. No. 12/691,737, filed on Jan. 22, 2010, entitled, "Visualizing a Layered Graph Using Edge Bundling," naming the inventors of Lev B. Nachmanson, et al.

Figure 24:
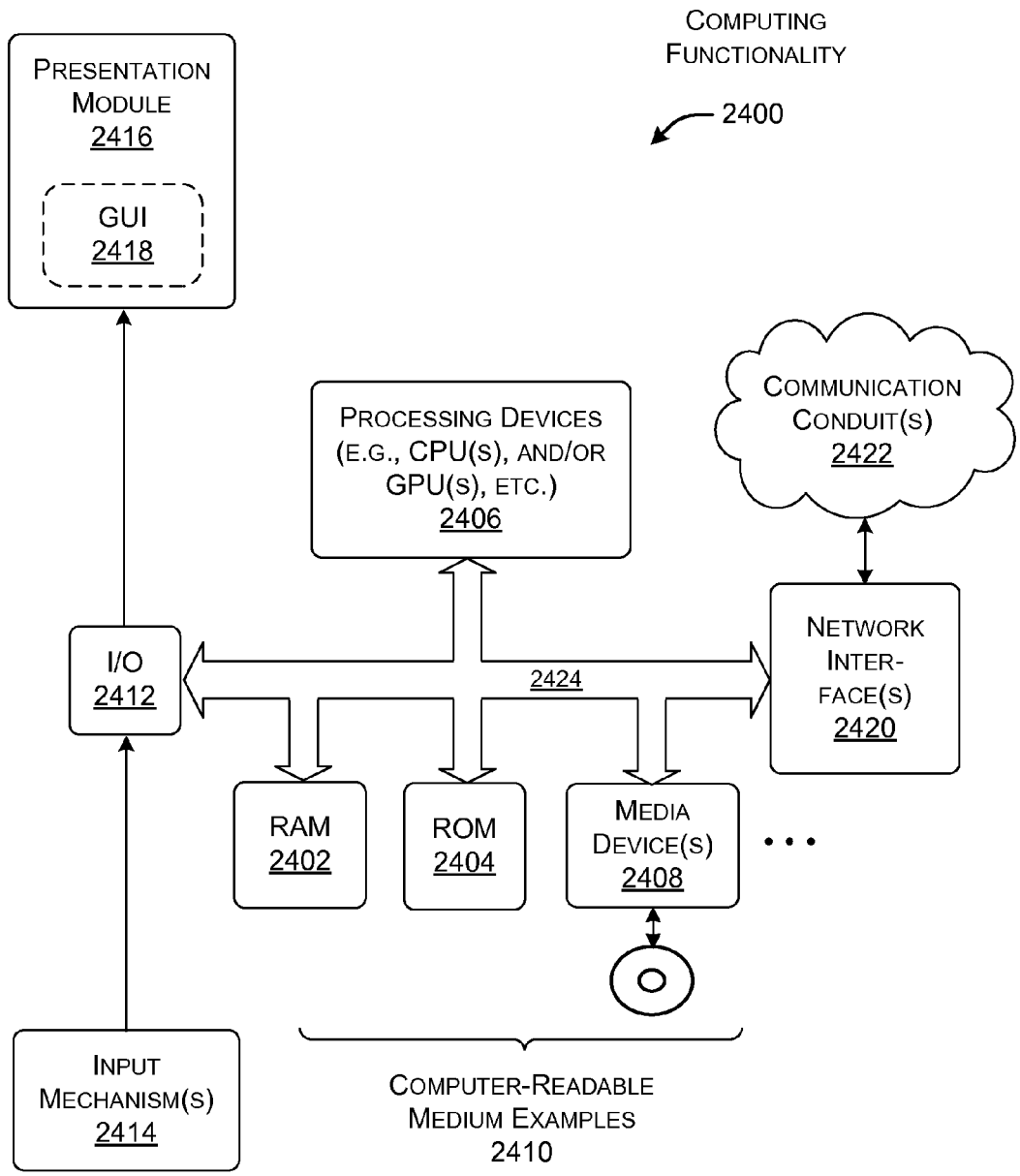
FIG. 24 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (for instance, by software, hardware, firmware, etc., and/or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 24, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (for instance, by software, hardware, firmware, etc., and/or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Overview of a Graph Processing Module

Figure 1:
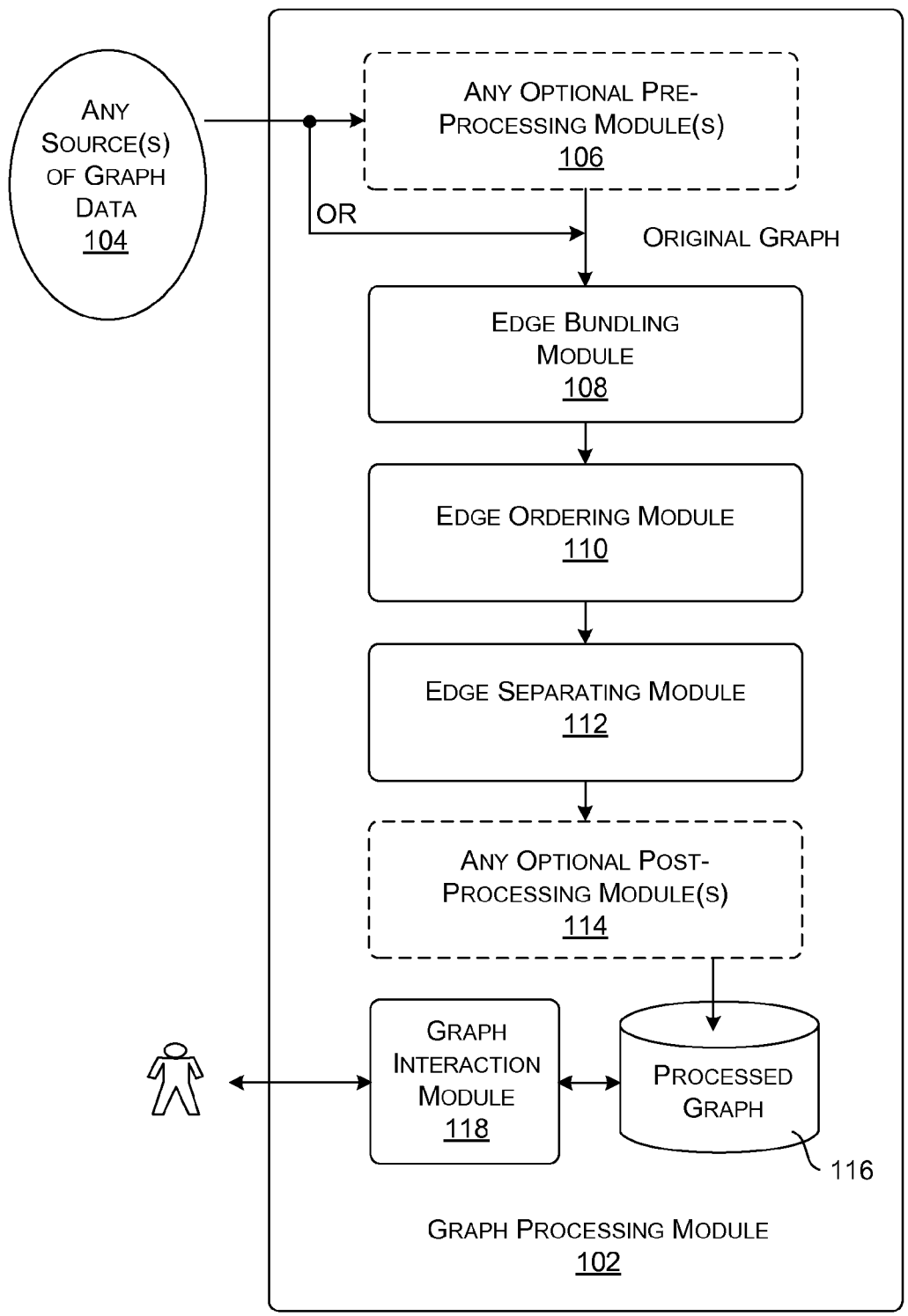
FIG. 1 shows an illustrative graph processing module for producing a processed graph containing ordered edge bundles.

FIG. 1 shows an illustrative graph processing module 102 for producing a processed graph containing ordered edge bundles. The processed graph is produced from graph data obtained from any source or combination of sources, referred to below as source(s) 104. For example, at least one source may correspond to a local source with respect to the graph processing module 102, such as a local storage device associated with the graph processing module 102. In addition, or alternatively, at least one source may correspond to a remote source with respect to the graph processing module 102, such as a network-accessible storage device. The source(s) 104 can be coupled to the graph processing module 102 using any communication mechanism, such as a point-to-point connection, a local area network of any type, a wide area network of any type, and so on.

The graph data itself can represent any collection of entities and any collection of relationships among the set of entities. The graph data may be undirected or directed, or a combination thereof. In one example, the entities in the graph data may correspond to code modules in a program; here, the relationships may represent programmatic relationships among the code modules. In another example, the entities may correspond to people; here, the relationships may correspond to relationships among the people. In another example, the entities may correspond to items stored in a database; here, the relationships may correspond to links among those items. In another example, the entities may correspond to geographic entities, such as cities; here, the relationships may correspond to roads or other links between these entities, and so on. No limitation is placed herein on what may constitute an entity and what may constitute a relationship.

A pre-processing module 106 can receive the graph data in any form and perform any processing on the graph data. In one case, for example, the pre-processing module 106 represents the entities in the graph data as a set of node objects having defined positions in a plane. For example, the pre-processing module 106 can represent the entities as polygonal node objects, such as, without limitation, rectangles, ovals, etc. In some cases, the pre-processing module 106 uses any algorithm to automatically select the positions of the node objects. In other cases, the graph data itself dictates or suggests the positions of the node objects (such as in the case in which the node objects represent geographic entities). In other cases, a user may manually select the positions of the node objects.

The pre-processing module 106 can represent the relationships among the entities as a set of original paths which connect the node objects together (although the pre-processing module 106 need not expressly draw such original paths). More specifically, each original path can be considered as specifying at least a source node object and a target node object. In the case of a directed graph, the source node and the target node may be specified by the directionality of the graph data; in an undirected graph, the source node and the target node can be chosen in an arbitrary manner. According to the terminology used herein, the output of the pre-processing module 106 constitutes an original graph. Alternatively, the graph processing module 102 can receive an already-formed original graph from the source(s) 104.

The graph processing module 102 operates on the original graph to improve its layout. Namely, the graph processing module 102 attempts to determine routes between respective source node objects and target node objects that provide an aesthetically pleasing graph layout that is easy to understand. In this task, the graph processing module 102 can consider the positions of the source node objects and the target node objects as given and fixed; alternatively, the graph processing module 102 can vary the given positions of the source node objects and the target node objects to some extent.

The graph processing module 102 operates on the original graph in three phases using three respective modules. Namely, an edge bundling module 108 selects edges to construct new paths in such a manner as to produce a bundled graph. The bundled graph includes instances at which edges which run generally close together, belonging to two or more paths, are bundled together. An edge ordering module 110 orders paths within the bundled graph to produce an ordered bundled graph. And an edge separating module 112 separates the edges in the ordered bundled graph to produce a processed graph. An introductory explanation of these three phases of processing will be provided below in the context of the description of FIGS. 2 and 3.

In one case, the graph processing module 102 produces a final processed graph based on a combination of the edge bundling module 108, the edge ordering module 110, and the and edge separation module 112, as implemented in the manner described herein in Sections B-D. Each of these modules also has separate utility. For example, the edge bundling module 108 can be used without the ordering and separation operations described in Sections C and D. Or the edge ordering module 110 can be used to order paths in a graph that has not been produced using the particular type of bundling operation described in Section B, and/or without the subsequent separation operation described in Section D. Or the edge separation module 112 can be used to separate edges in a graph without one or more of the preceding bundling and/or ordering operations described in Sections B and C, and so on.

An optional post-processing module 114 can perform any optional post-processing on the processed graph. To cite merely one example, the post-processing module 114 can assign different colors, opacities, and/or shadings, etc. to different node objects and/or paths within the processed graph.

At the termination of processing, the graph processing module 102 can store the processed graph in a data store 116. A graph interaction module 118 provides a visual rendering of the processed graph on any output device, such as a computer monitor, a printer, etc. The graph interaction module 118 also allows the user to dynamically interact with the processed graph. For example, the user can use the graph interaction module 118 to zoom in on any portion of the processed graph. This allows the use to more readily explore fine detail that appears within "crowded" portions of the processed graph. The user can also use the graph interaction module 118 to select and highlight individual parts of the processed graph, such as individual node objects, individual paths, individual edges, and so on.

The graph processing module 102 can be implemented using any computing functionality. For example, the graph processing module 102 can be implemented by one or more local computing devices of any type ("local" meaning local with respect to the user), such as a personal computer, a laptop computer, a handheld computer of any type (such as a mobile telephone), and so on. Alternatively, all of the functions performed by the graph processing module 102 can be implemented by one or more remote computing devices. The user may access the remote computing device(s) using browsing functionality provided by a local computing device. Alternatively, the functions performed by the graph processing module 102 can be implemented by a combination of local resources and remote resources. Section E provides additional details regarding computing functionality that can be used to implement any aspect of the graph processing module 102.

Figure 2:
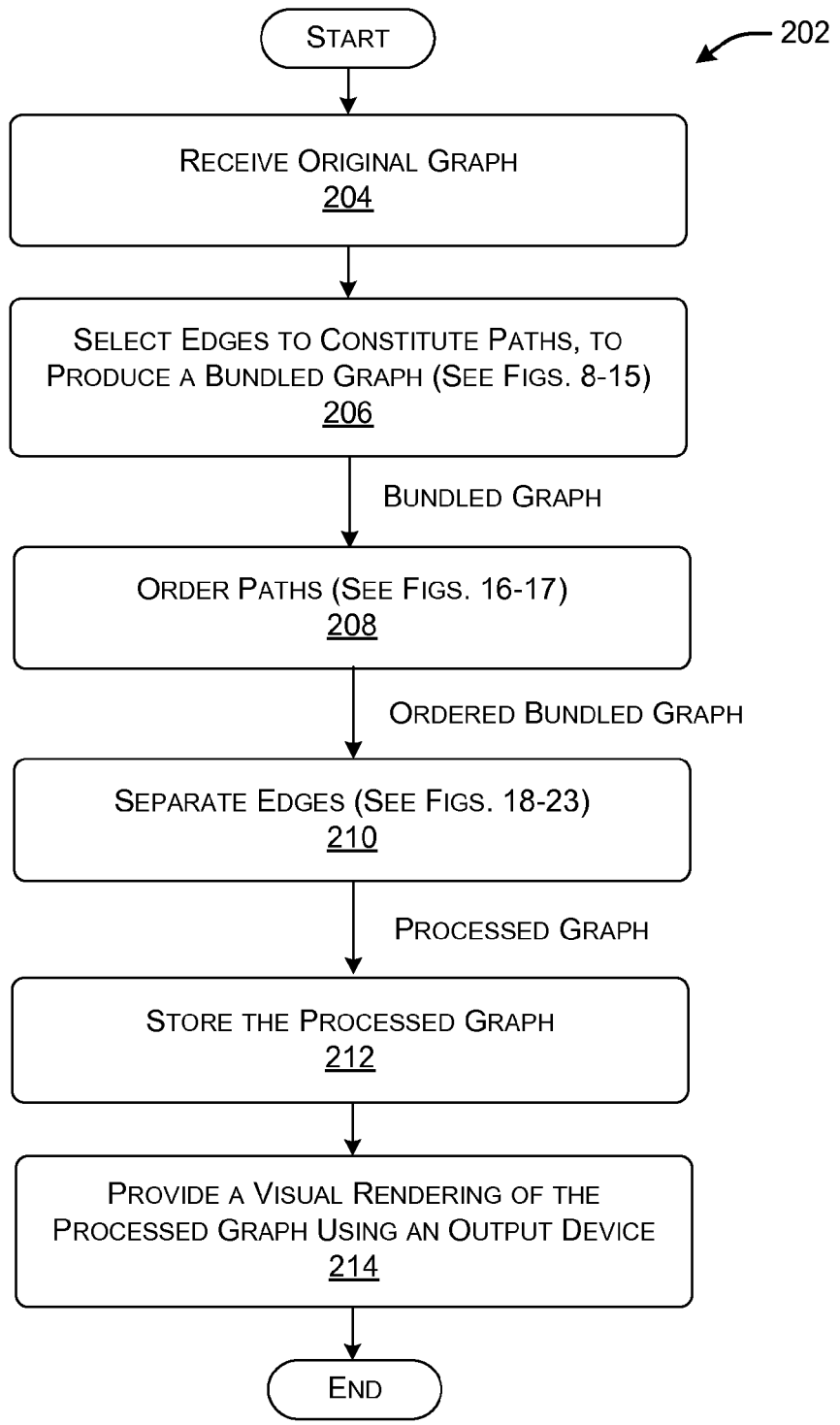
FIG. 2 shows an illustrative procedure that provides an overview of one manner of operation of the graph processing module of FIG. 1.

FIG. 2 shows a procedure 202 which provides an overview of one manner of operation of the graph processing module 102 of FIG. 1. The procedure 202 will be explained in conjunction with representative graphs shown in FIG. 3. Follow-up Sections B-D will provide yet further details regarding different individual functions performed by the procedure 202.

Figure 3:
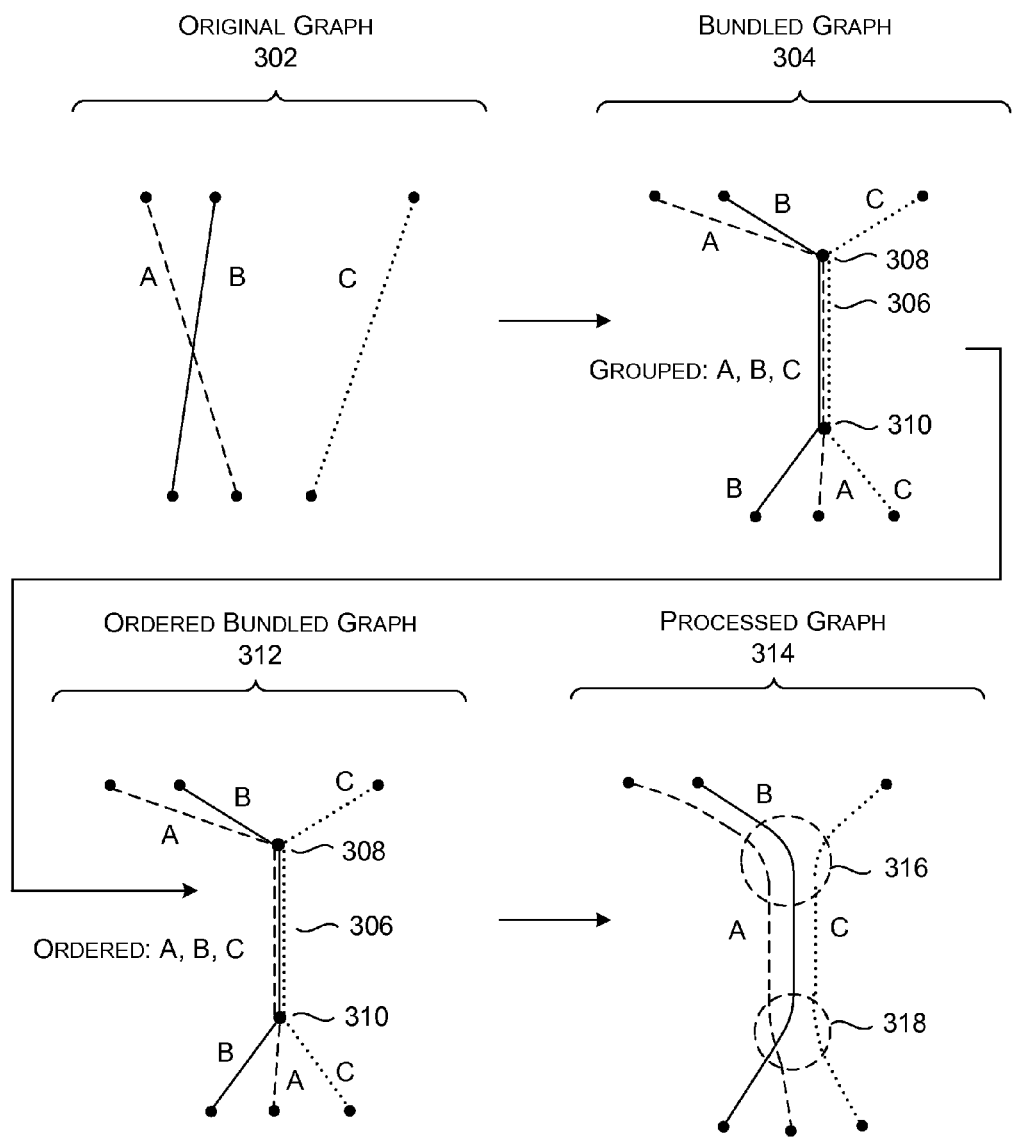
FIG. 3 shows an illustrative series of graphs associated with different stages of the procedure set forth in FIG. 2.

In block 204, the graph processing module 102 receives an original graph, e.g., from the pre-processing module 106 or directly from the source(s) 104. The original graph can include a plurality of node objects that are coupled together using a set of relationships. The relationships can be conceptualized as a set of original paths (although, as said, the original graph need not expressly draw such original paths). For example, FIG. 3 shows a portion of an original graph 302. That portion includes three original paths, labeled A, B, and C. Each original path connects a source node object and a target node object, represented as dots in FIG. 3. As said, the graph processing module 102 generally considers the positions of the source node objects and the target node objects as fixed or variable (to some extent).

In block 206, the edge bundling module 108 selects edges to construct new paths, so as to create a bundled graph that contains bundled paths. To perform this task, the edge bundling module 108 may first form a candidate-edge representation of the original graph, referred to here as a candidate-edge graph. The candidate-edge graph comprises a plurality of vertices and a plurality of candidate edges, where each candidate edge is defined with respect to two vertices. For example, the candidate-edge graph can be expressed as a sparse visibility graph, a diagram containing Voronoi edges, etc. After forming the candidate-edge graph, the edge bundling module 108 selects candidate edges from the candidate-edge graph to create new paths. In other words, the edge bundling module 108 creates each path by picking out one or more candidate edges in the candidate-edge graph which, taken together, lead from a source node object to a target node object, where the source node object and the target node object are specified by a corresponding original path in the original graph. At least some of the paths that are created may include bundled edges. A bundled edge within the bundled graph comprises an edge that is shared by two or more paths.

For example, FIG. 3 shows a portion of a bundled graph 304. The bundled graph 304 specifies three new paths, labeled as paths A, B, and C. These new paths can be viewed as reconstructed versions of the original paths specified in the original graph 302, sharing the same respective source node objects and target node objects as the original paths. The new paths each contain three edges, selected from the candidate-edge graph. The middle edge 306 in the bundled graph 304 is common to all three paths. At a vertex 308, the three paths (A, B, and C) diverge. Likewise, at vertex 310, the paths (A, B, and C) diverge.

As will be set forth in greater detail in Section B (below), the edge bundling module 108 achieves the type of bundling illustrated in FIG. 3 by minimizing a cost function. That cost function includes two components: (a) an ink component; and (b) a summed-path component. The ink component defines a collective length of all edges used by paths in the bundled graph. The summed-path component defines a sum of weighted lengths of the paths in the bundled graph. The ink component reflects an extent of bundling that is produced in the bundled graph, whereas the summed-path component reflects lengths of the paths in the bundled graph. As a net result, the bundling operation achieves bundling of paths while, at the same time, discourages the use of overly long paths. Again, Section B will clarify the bundling concepts set forth in this introductory section.

In block 208, the edge ordering module 110 defines the order of paths for each edge in the bundled graph. This operation produces an ordered bundled graph. For example, FIG. 3 shows a portion of an ordered bundled graph 312. For example, for the edge 310→308, at vertex 310, the edge ordering module 110 indicates that path A precedes path B, and path B precedes path C.

In block 210, the edge separating module 112 separates edges in the ordered bundled graph to produce the final processed graph. For example, FIG. 3 shows a portion of a processed graph 314. In that portion, the edge separating module 112 pulls apart the edges of the three paths (A, B, and C). As a result, the edges within the bundled edge 306 are now drawn as three distinct segments, allowing a user to visually trace the individual paths in their entireties.

In one implementation, the edge separating module 112 draws each path as one or more linear segments and/or one or more curved-lined segments. More specifically, the edge separating module 112 first establishes hubs at respective vertices in the ordered bundled graph. The edge separating module 112 then draws one or more curved-line segments in each hub. The edge separating module 112 then draws one or more linear segments which are connected to respective curved-lined segments. Hence, at least some linear segments connect respective hubs together.

For example, in FIG. 3, the edge separating module 112 can associate vertex 308 with a first circular hub 316 and vertex 310 with a second circular hub 318. Each hub includes three curved-line segments which route the paths (A, B, and C) in appropriate directions. Two linear segments are coupled to respective ends of each curved-line segment. Section D provides additional details regarding the operation of the edge separating module 112, including the manner in which the edge separating module 112 defines the radii of the hubs.

In block 212, the graph processing module 102 stores the processed graph in the data store 116. In block 214, the graph processing module 102 provides a visual rendering of the processed graph to a user. The user may then interact with the processed graph in any manner, such as any of the ways described above.

Figure 4:
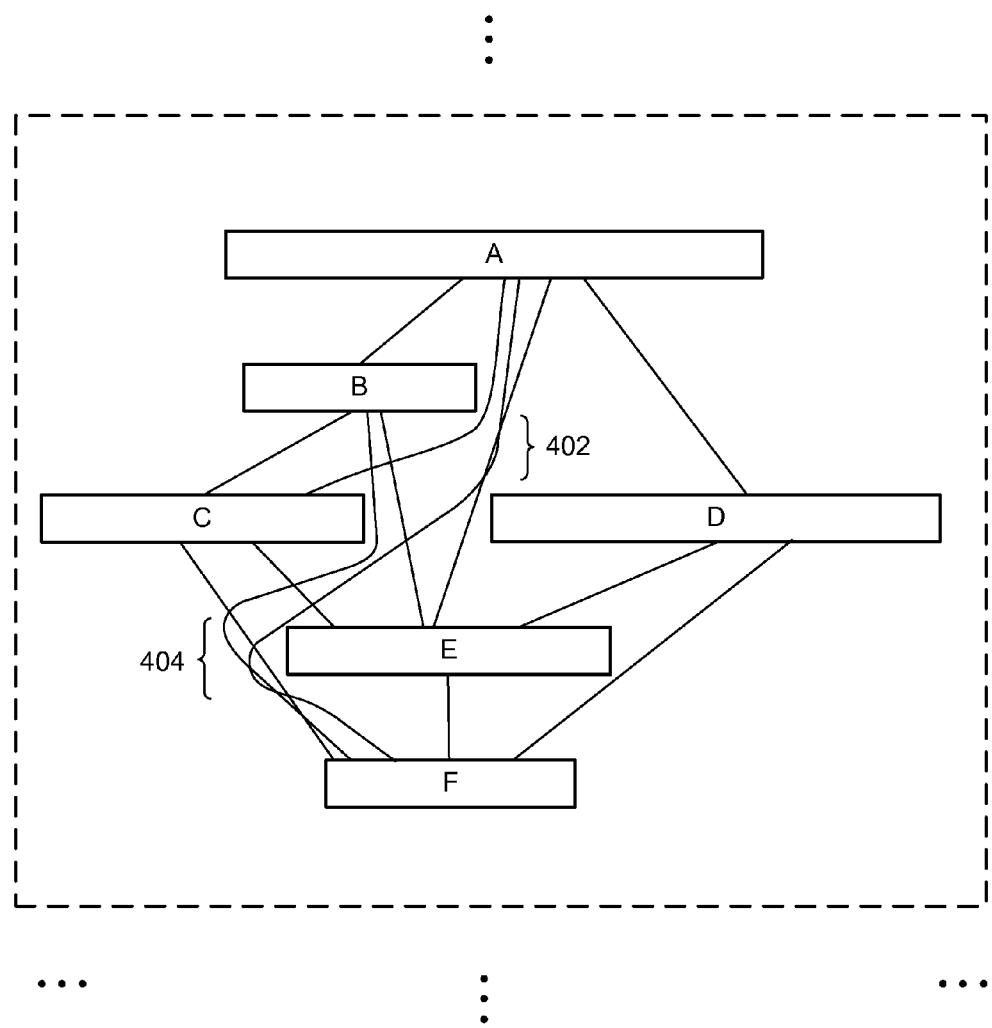
FIG. 4 shows a sample of an original graph.

FIGS. 4-7 provide simplified examples of the operation of the graph processing module 102. To begin with, FIG. 4 shows a portion of an original graph, e.g., prior to any processing performed by the edge bundling module 108, the edge ordering module 110, and the edge separating module 112. The original graph includes a plurality of rectangular node objects, assigned the labels A-F. The original graph may also include original paths which connect the node objects together. This particular original graph is not unduly complex. Nevertheless, note that it may include portions that exhibit ambiguous path intersections, such as portion 402 and portion 404. Specifically, both of these portions (402, 404) contain small-angle intersections of edges. A user may have difficulty visually tracing individual paths through these intersections. For example, at such an intersection, the user may mistakenly assume that a particular path being traced continues along a particular edge, when, in fact, this edge belongs to another path.

Figure 5:
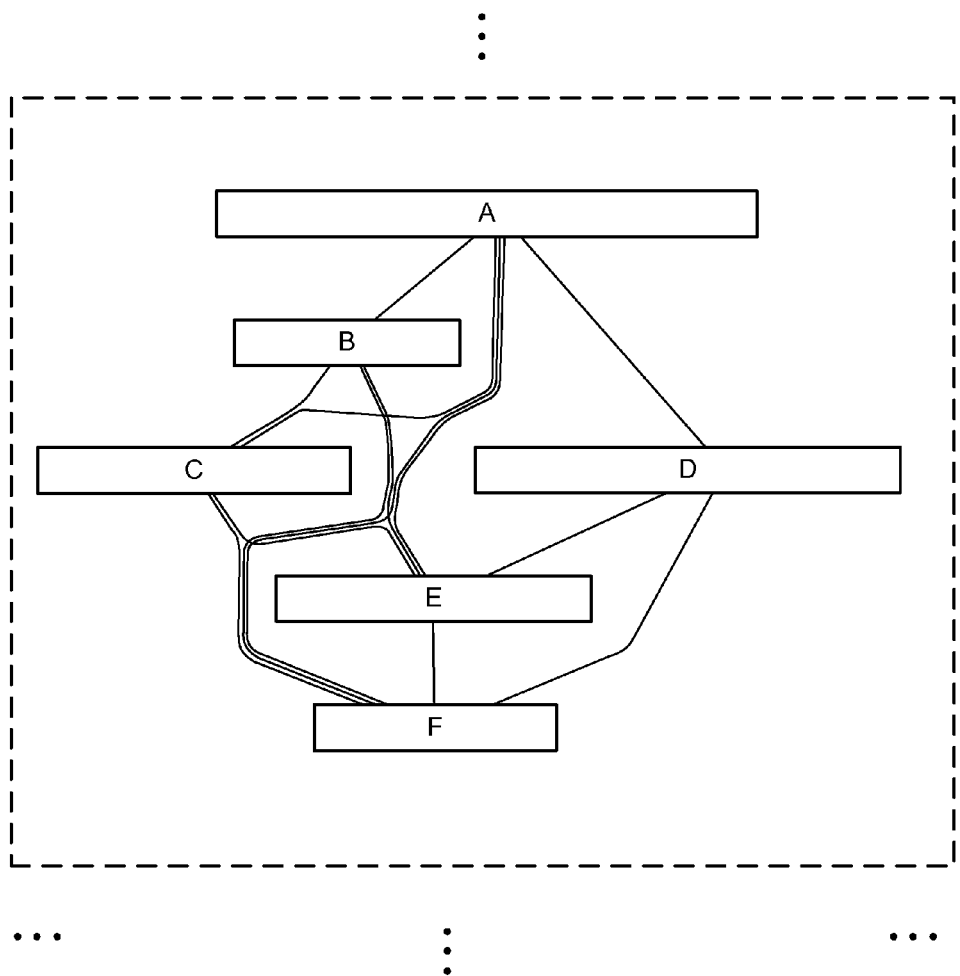
FIG. 5 shows a sample of a processed graph which represents a transformation of the original graph of FIG. 4.

FIG. 5 shows a portion of a processed graph that is produced based on the original graph of FIG. 4. The processed graph includes a plurality of hubs (although not expressly demarcated in FIG. 5 with bounding circles). Each hub includes one or more curved-line segments which route one or more respective paths in appropriate directions. Linear segments are connected to the ends of the curved-line segments. Other linear segments directly connect respective source node objects and target node objects together. Finally, note that some portions of the processed graph include bundled edges. Specifically, at various portions, the processed graph includes bundles of up to four edges. Overall, the processed graph reduces the amount of clutter compared to the original graph of FIG. 4. Further, the processed graph eliminates or reduces instances at which edges make small-angle intersections, and reduces the total number of intersections.

Figure 6:
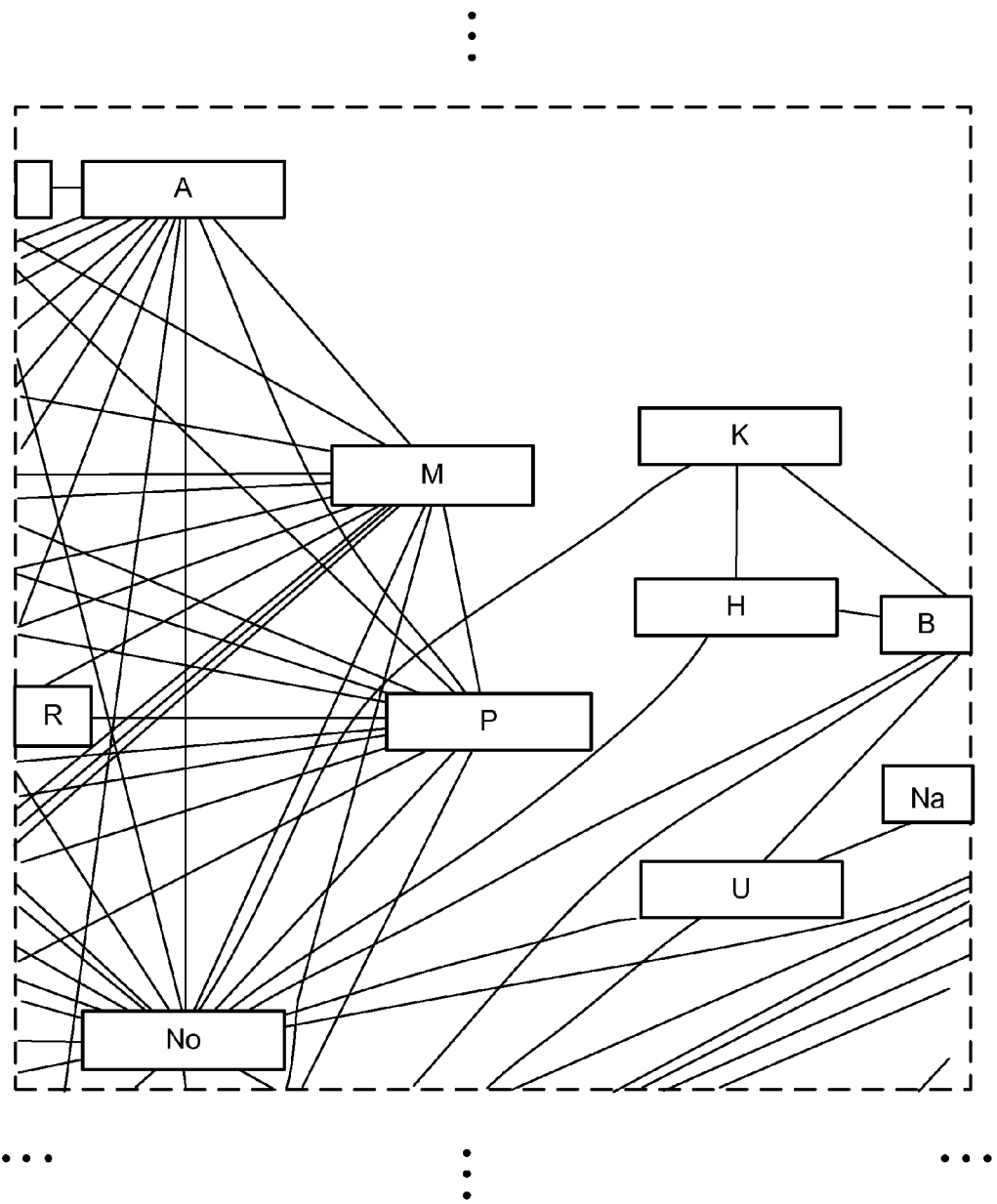
FIG. 6 shows a sample of another original graph.
Figure 7:
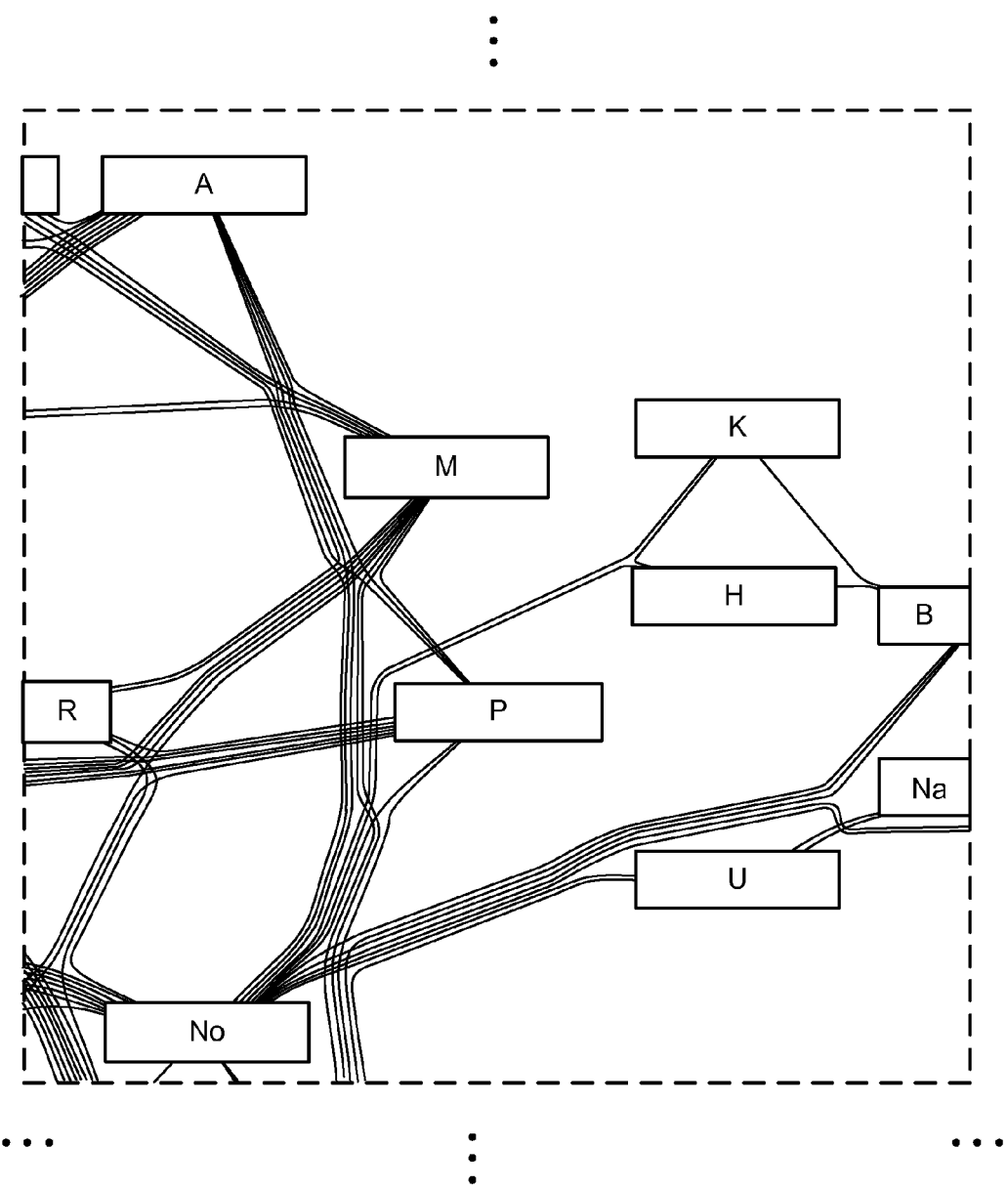
FIG. 7 shows a sample of another processed graph which represents a transformation of the original graph of FIG. 6.

FIG. 6 shows another sample of an original graph that is more complicated compared to the original graph of FIG. 4. FIG. 7 shows a processed graph that is produced based on the original graph of FIG. 6. The processed graph of FIG. 7 includes the same general features as the processed graph of FIG. 5, but is more complex. For example, the processed graph in FIG. 7 includes some bundles having more than six edges. A user may zoom in on any portion of the processed graph, or highlight individual paths, in order to gain a better understanding of the fine detail expressed in that portion.

Overall, the graph processing module 102 produces processed graphs that are aesthetically pleasing, having a reduced amount of clutter. Further, the processed graphs may allow a user to more readily pick out salient features expressed by the graph data, such as interesting relationships among entities in the graph data.

B. The Edge Bundling Module

The edge bundling module 108 selects edges to form a bundled graph by minimizing a cost function. According to one implementation, the cost function can be expressed as:

$$\alpha * \text{ink} + K * \Sigma_{uv \in P} w_{uv} l_{uv} \qquad (1).$$

Overall, this expression includes two components—an ink component and a summed-path component. More specifically, ink denotes the ink component, representing the sum of edge lengths used by the paths. For example, ink of the bundled graph 304 of FIG. 3 comprises the sum of the lengths of the seven segments used by the paths. Three of such segments emanate from vertex 308 and another three segments emanate from the vertex 310. The seventh segment is edge 306, which connects vertex 308 to vertex 310. More specifically, the edge 306 contributes only one length to the ink component, although it represents three underlying edges for paths A, B, and C. The symbol $\alpha$ is a coefficient which determines the contribution of the ink component to the cost function.

The expression $\Sigma_{uv \in P} w_{uv} l_{uv}$ denotes the summed-path component. More specifically, this component defines the sum of weighted path lengths in the bundled graph. For example, the summed-path component of the bundled graph 304 of FIG. 3 is equal to $w_A l_A + w_B l_B + w_C l_C$, where $l_A$, $l_B$, and $l_C$ refer to the respective lengths of paths A, B, and C, and $w_A$, $w_B$, and $w_C$ refer to weighting factors applied to these respective paths. In this case, the shared edge 306 contributes to each length ($l_A$, $l_B$, and $l_C$) in the summed-path component, rather than just once as in the case of the ink component. The symbol K is a coefficient which determines the contribution of this component to the cost function.

More formally stated, the symbol uv defines a path in the bundled graph between a source node u and a target node v, which is a member of a set of paths P. The symbol $l_{uv}$ refers to a length of the path uv. And the symbol $w_{uv}$ is a weighting parameter which modifies the length $l_{uv}$. In one example, the weighting parameter defines an inverse of the straight-line (Euclidean) distance ($d_{uv}$) between the node u and the node v, that is $w_{uv} = 1/d_{uv}$.

The ink component reflects bundling in the graph, in the sense that minimization of this component encourages the edge bundling module 108 to route paths along common edges (upon which the common edges will be counted only once in the computation of ink). In a similar manner, the summed-path component discourages the selection of long paths in the bundled graph.

The effect produced by minimizing the ink component is not necessarily aligned with the effect produced by minimizing the summed-path component. For example, in order to save ink, it may be appropriate to route many paths along a particularly long common edge, e.g., where that path may follow the perimeter of an obstacle. But this may produce a result that is aesthetically unappealing and difficult to understand. The summed-path component effectively reduces the inclusion of such long paths in the bundled graph. A user may set the values of $\alpha$ and K to produce any desired trade-off between bundling and path length curtailment.

Figure 8:
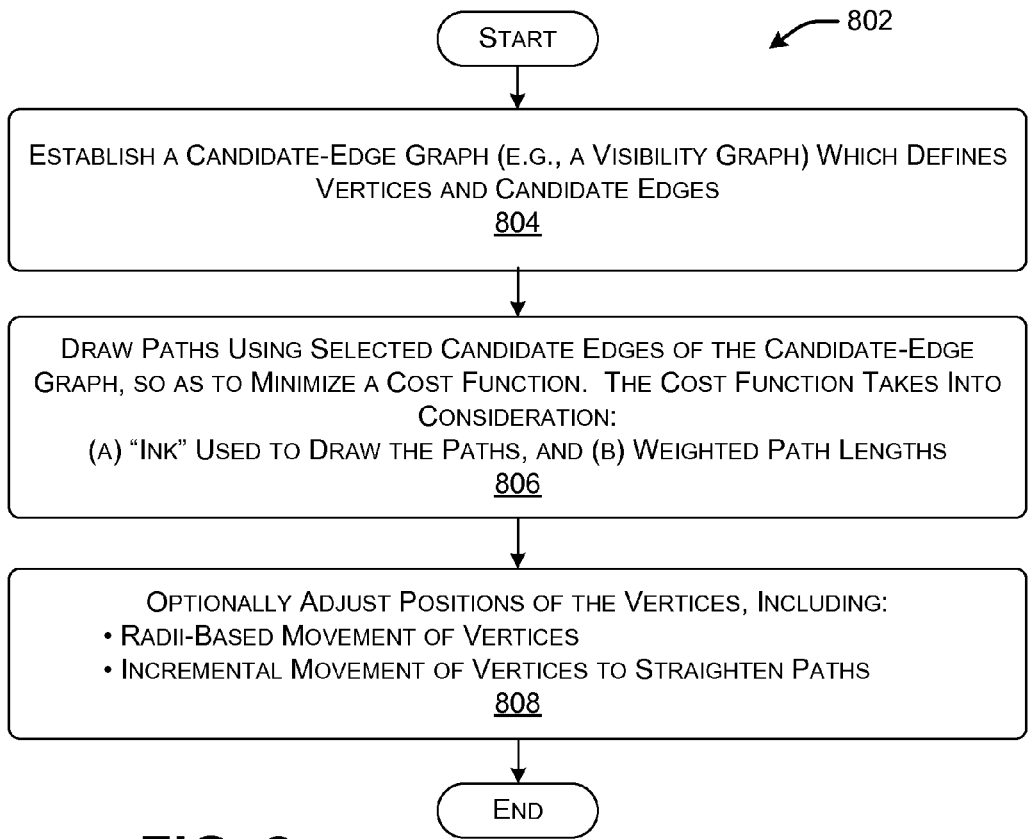
FIG. 8 shows an illustrative procedure that sets forth one manner of operation of an edge bundling module of the graph processing module shown in FIG. 1.

In one case, the edge bundling module 108 draws paths anywhere within a space defined by the original graph, that is, without constraints as to the placement of such paths. In another case, the edge bundling module 108 constrains the selection of path edges in various ways. Constraining the selection of paths can result in a processed graph that is less cluttered and easier to interpret than the unconstrained solution, and can also reduce the computational complexity of the problem, resulting in a quicker-executing and more efficient implementation (compared to the unconstrained solution). FIG. 8 shows one possible procedure 802 for constraining the selection of paths.

Referring to FIG. 8, in block 804, the edge bundling module 108 first defines a candidate-edge graph based on the original graph. As set forth in Section A, a candidate-edge graph transforms the original graph into a plurality of vertices and a plurality of candidate edges, where each candidate edge is defined with respect to a pair of vertices.

Figure 10:
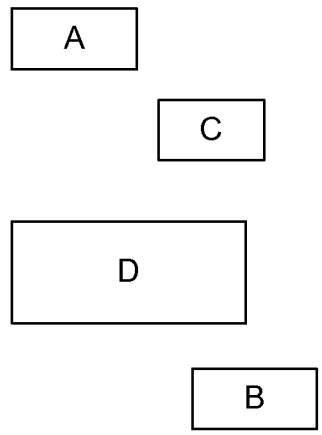
FIG. 10 shows a series of node objects associated with an original graph.
Figure 11:
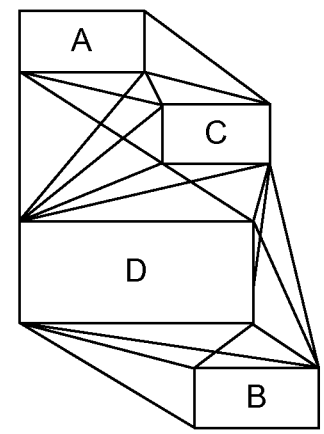
FIGS. 11 and 12 show two candidate-edge graphs that are constructed on the basis of the node objects of the original graph shown in FIG. 10.
Figure 12:
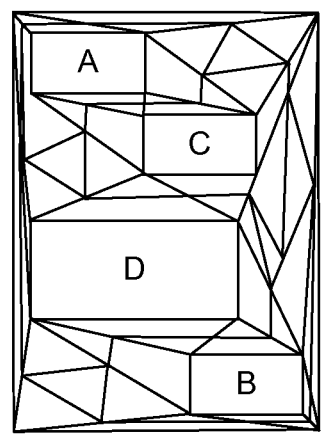

For example, FIG. 10 shows an original graph that includes four rectangular node objects, labeled A-D (although node objects can have any shape). FIG. 11 shows one type of candidate-edge graph that is formed based on the node structure of FIG. 10; that candidate-edge graph comprises a sparse visibility graph. FIG. 12 shows another type of candidate-edge graph that is formed based on the node structure of FIG. 10; that candidate-edge graph includes Voronoi edges. These two examples are representative, not exhaustive; still other techniques can be used to form the candidate-edge graph.

In the sparse visibility graph of FIG. 11, some of the corners of the node objects in FIG. 10 define vertices. The candidate edges include straight-line segments which connect together pairs of respective vertices, providing that such edges do not intersect any node objects. The visibility graph is considered sparse insofar as it includes only a subset of a total number of edges that can be produced between node objects in the original graph. In the diagram of FIG. 12, the vertices include the points that are equidistant to two or more different node objects.

Returning to FIG. 8, in block 806, the edge bundling module 108 draws each path by selecting candidate edges from the candidate-edge graph. The selected edges of a path, when assembled together, extend from a source node object to a target node object, where the source node object and the target node object are specified by the original graph. More specifically, the edge bundling module 108 selects those edges which satisfy the minimization problem described above. Overall, this results in the selection of paths that include a desired degree of bundling and a desired degree of path-shortening.

Figure 14:
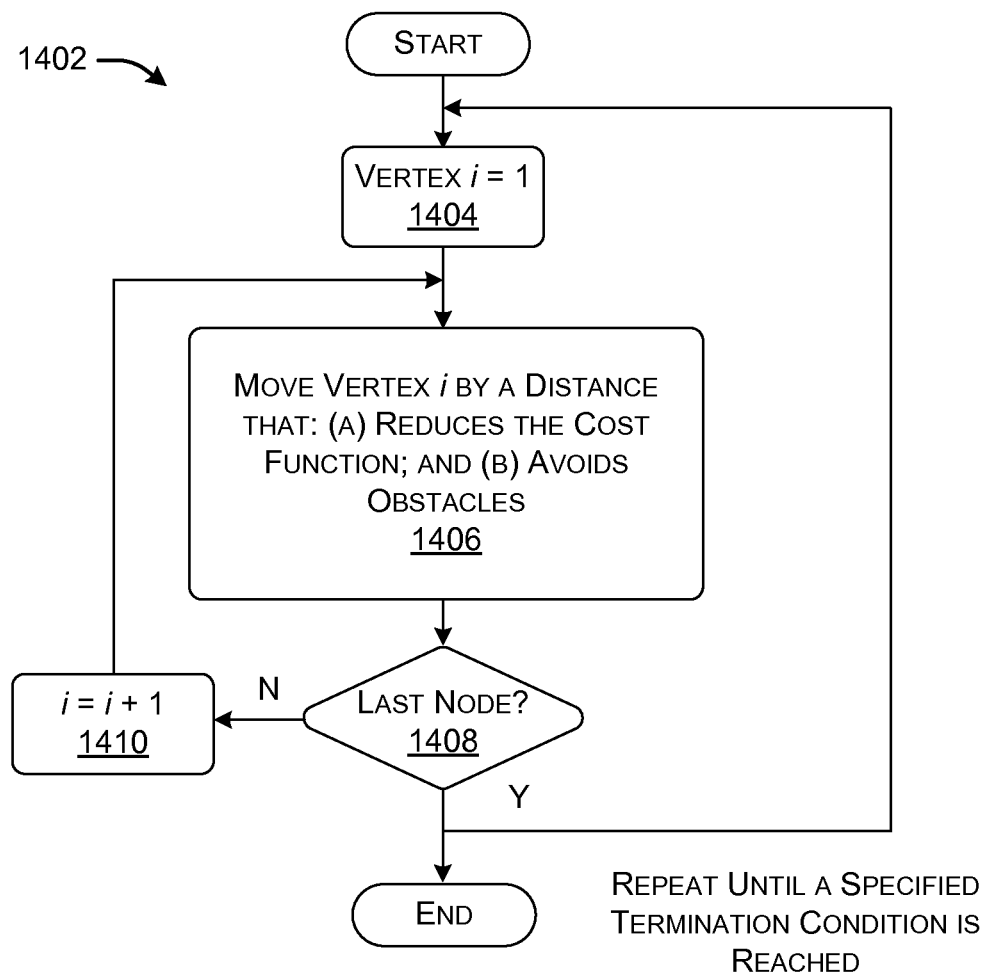
FIG. 14 shows an illustrative procedure for adjusting the positions of vertices in the bundled graph, performed within the bundling procedure of FIG. 8.

In block 808, the edge bundling module 108 optionally incrementally adjusts the positions of all vertices associated with the bundled graph, or at least the vertices that are specifically associated with the paths in the bundled graph. This improves the appearance of the bundled graph, e.g., by straightening paths in the bundled graph. FIG. 14, described below, sets forth one way of implementing block 808.

Figure 9:
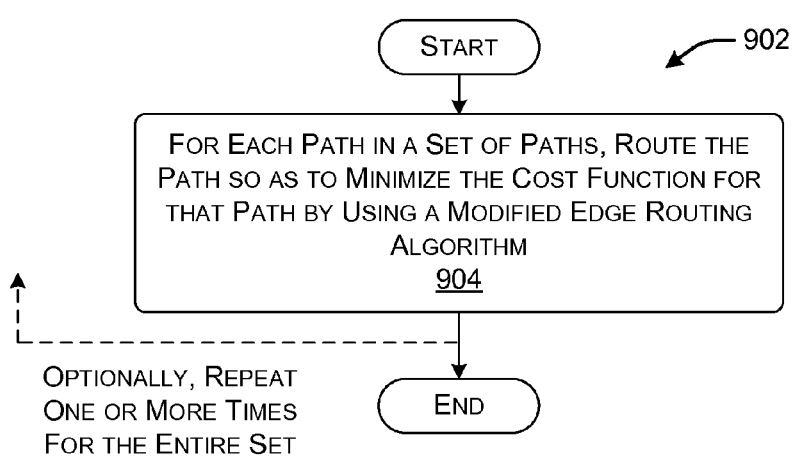
FIG. 9 shows an illustrative path-by-path procedure that represents one manner of implementing the procedure of FIG. 8.

Now describing the cost-minimization step of block 806 in greater detail, in one case, this operation may be implemented by finding the overall minimum cost over all possible selections of the full set of paths in the candidate-edge graph. In another case, the selection of paths in the candidate-edge graph may be further constrained in various ways, so as to obtain an approximate solution to the minimization problem of block 806. The approximate solution has reduced computational complexity compared to the unconstrained selection of paths, and therefore can be performed more quickly and efficiently compared to the unconstrained solution. FIG. 9 shows a procedure 902 which represents one such approximation of the minimization problem in block 806.

The procedure 902 shown in FIG. 9 proceeds by routing individual paths in the bundled graph one by one. This may be performed by listing the paths in any order, where each pair comprises a source node and destination node, as specified in original graph data. In one case, the order may be arbitrary. In another case, the order may depend on the structure of the graph (such as the Euclidean distances between pairs of nodes). Then, for each pair of nodes in this list, the procedure 902 finds a path connecting the two nodes with a view to minimizing the cost for that selected path, given the paths already chosen. Optionally, the procedure 902 may then iterate over the list of pairs one or more additional times, rerouting the paths so as to further reduce the cost.

More specifically, in block 904, the edge bundling module 108 uses a modified path routing algorithm to route each individual path. In one implementation of this algorithm, the edge bundling module 108 assigns cost values to individual edges based on expression (1) defined above each time it seeks to route a path. For example, assume that a new path is to be routed between vertices u and v. As before, let $d_{uv}$ represent the Euclidean distance between u and v. The cost value of an edge e is $\Delta ink_e + K*l_e/d_{uv}$, where $\Delta ink_e$ is zero if the edge e has already been used by one or more previous paths already routed by the edge bundling module 108, and $\Delta ink_e$ is $\alpha*l_e$ otherwise. Here $\alpha$ and K are as defined above with respect to expression (1). Based on this manner of assigning cost values, the edge bundling module 108 finds the route through the graph that has the minimum aggregate cost value (for that particular path). In performing this investigation, the edge bundling module 108 can rely on any edge routing algorithm, such as, but not limited to, Dijkstra's shortest path algorithm. But, to repeat, the cost values for individual edges are defined in the novel manner described above; they do not represent edge length distances per se.

Figure 13:
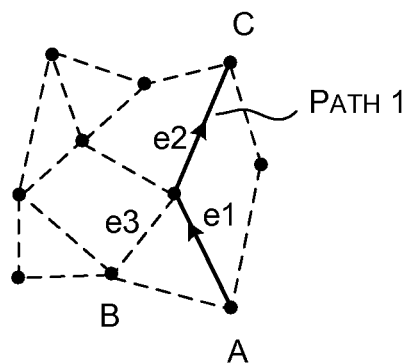
FIG. 13 shows a portion of a graph for use in demonstrating the operation of the procedure of FIG. 9.

For example, consider the simplified example of a candidate-edge graph shown in FIG. 13. Assume that at least one path has already been formed between vertex A and vertex C; that path is formed using edges e1 and e2. Now assume that the graph bundling module 108 is attempting to find the shortest path through the candidate-edge graph from vertex B to vertex C. The edges e1 and e2 will be weighted in a manner that indicates that they constitute part of at least one prior-generated path. The edge e3 is weighted in a manner that indicates that it is not yet a member of any prior-generated path. In effect, this selective weighting defines whether an edge will contribute to the ink component. If the edge is already a part of a pre-existing path, it will not contribute to the ink component. Suppose that the new path is routed between nodes B and C using edges e2 and e3. When routing the next new path, the edge e3 will now be weighted in a manner to indicate that it contributes to the formation of at least one existing path.

Advancing to FIG. 14, this figure shows a procedure 1402 for implementing block 808 of FIG. 8. In this procedure 1402, the edge bundling module 108 adjusts the positions of vertices in the bundled graph, where the vertices were originally defined by the candidate-edge graph. This processing procedure 1402 can be performed in an iterative manner, e.g., by sequencing through all the vertices in the bundled graph, or at least the vertices that are selectively associated with the paths in the bundled graphs.

As a preliminary operation, the edge bundling module 108 can attempt to move each vertex in the bundled graph to spatially accommodate the hubs (where the hubs will play a role in the edge separation phase, to be described in Section D below). To move a vertex, the edge bundling module 108 can determine a new vertex position that satisfies the following constraint, to an extent possible: a distance between the new vertex position and a nearest obstacle to the new vertex position is expected to be greater than or equal to a radius of a hub that is associated with the vertex (where the manner of calculating the radius of the hub is described below in greater detail in Section D). Generally, the application of this rule has the effect of pulling the vertex away from obstacles (if deemed appropriate) into an open space in the bundled graph, to thereby provide space for any edge bundles that will pass through the vertex. In one approach, the edge bundling module 108 can move the vertex in the manner described above using an iterative approach, that is, by incrementally moving the vertex in successive steps until a successful move has been achieved (in which the new vertex position satisfies the above constraint), or one or more unsuccessful moves have been encountered. Further, this type of processing can be performed on the entire set of vertices one or more additional times. But in some cases, it may not be possible to move a vertex to a full extent that is deemed desirable to accommodate the radius of the vertex's hub.

Once the radii-based movements have been performed (as described above), the edge bundling module 108 can further adjust the vertices to straighten the paths. For example, in block 1404, the edge bundling module 108 initializes an index value to point to a first vertex, i.e., vertex i=1. In block 1406, the edge bundling module 108 moves the designated vertex an incremental amount in a given direction. Block 1406 can be implemented in many different ways. In one representative approach, the edge bundling module 108 can randomly select a direction at which to move the vertex. The edge bundling module 108 can then perform two tests on the new position. The first test determines whether the proposed move will interfere with any obstacles in the candidate-edge graph, such as any node objects. The second test determines whether the proposed move will achieve a desired effect of reducing the cost function. For the second test, the cost function may be the same function as described above (e.g., in Equation (1)). Alternatively, a different cost function may be used; for example, a function can be used which favors straight paths.

If the first test is not satisfied, the edge bundling module 108 can explore the feasibility of moving the vertex by a diminished amount. For example, assuming that the original offset corresponds to a distance h, the edge bundling module 108 can investigate the feasibility of moving the vertex by a distance h/2. The edge bundling module 108 can repeat this procedure any number of times (each time choosing a small increment) until the edge bundling module 108 selects a distance that is valid, insofar that it does not interfere with any obstacles. Alternatively, this operation can be performed in reverse, that is, by successively increasing the distance. For example, in a first trial, the edge bundling module 108 can attempt to move the vertex by an amount h. If that move is valid (insofar that it does not interfere with an obstacle), the edge bundling module 108 can attempt to move the vertex by an amount 2*h. If that move is valid, the edge bundling module 108 can attempt to move the vertex by an amount 4*h, and so on, up until a final incremental amount.

If the second test is not satisfied, the edge bundling module 108 can explore the feasibility of moving the vertex in an opposite direction. For example, assume that the original proposed offset corresponds to a distance h in the positive x direction. If this move does not reduce the cost function, then the edge bundling module 108 can explore the feasibility of moving the vertex by a distance h in the negative x direction.

In one implementation, the edge bundling module 108 can perform the above-described processing first in the x direction and then in the y direction for each respective vertex.

In an alternative implementation, the edge bundling module 108 can perform preliminary analysis to determine an appropriate direction and/or an appropriate amount to move a vertex in order to minimize the cost function. Still other implementations of block 1404 are possible.

If the last node has not been reached (as determined in block 1408), then, in block 1410, the edge bundling module 108 increments the index. Then, in block 1406, the edge bundling module 108 repeats the above-described analysis with respect to the next vertex. When the last vertex in the bundled graph has been processed, the edge bundling module 108 can optionally repeat the above processing for the entire set of vertices. Generally, the edge bundling module 108 can repeat the procedure 1402 for the set of vertices until a maximum number of iterations is reached, or some other termination condition is reached.

Figure 15:
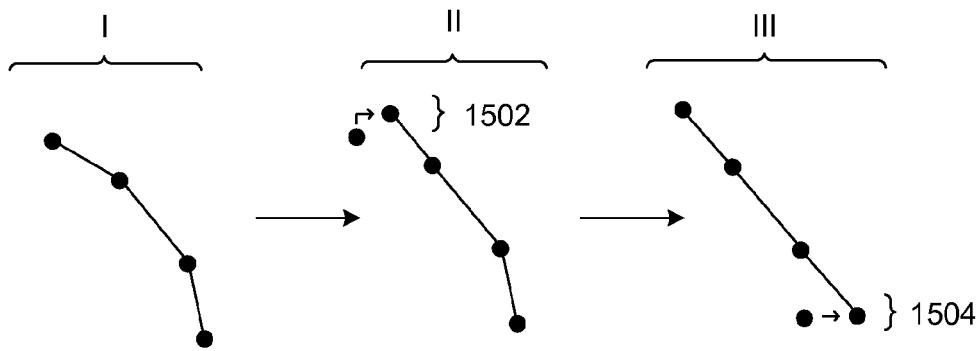
FIG. 15 shows a portion of a path for use in demonstrating the operation of the procedure of FIG. 14.

FIG. 15 shows an example of the operation the procedure 1402. Example I shows a portion of a path in the bundled graph, e.g., produced by the procedure 902 of FIG. 9. Further assume that the radii-based adjustment described above has already been performed. The path includes four vertices. Example II shows the same path after the movement of a vertex 1502. Example III shows the same path after the movement of a vertex 1504. The net effect of these changes is to straighten the path. This reduces the cost function and improves the appearance of the path.

C. The Edge Ordering Module

Figure 16:
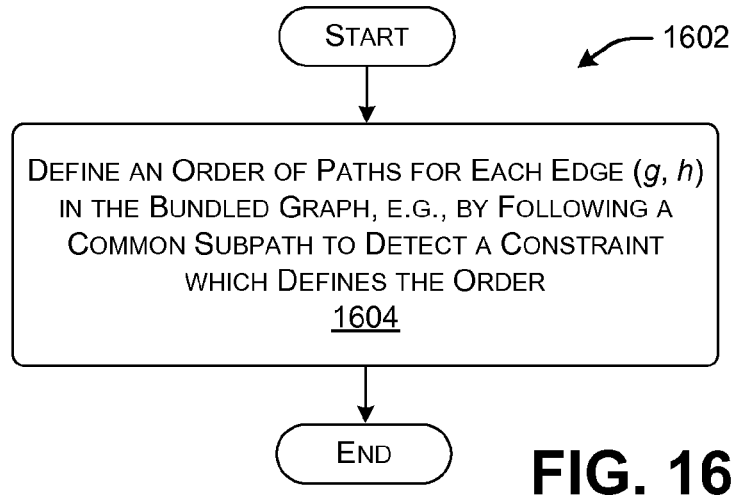
FIG. 16 shows a procedure that sets forth one manner of operation of an edge ordering module of the graph processing module shown in FIG. 1.

FIG. 16 shows a procedure 1602 that sets forth one manner of operation of the edge ordering module 110 of FIG. 1 for a particular edge (g, h) of the bundled graph between vertex g and vertex h; that edge (g, h), in turn, ultimately corresponds to an edge in the candidate-edge graph. Further, assume that the edge (g, h) is part of two or more paths which "pass through" the edge, including at least path A and path B. Block 1604 summarizes the processing performed for this particular edge (g, h). The edge ordering module 110 performs the same processing for all of the edges in the bundled graph.

In block 1604, the edge ordering module 110 computes two orders of paths for the edge (g, h), referred to as order O(g, h) and order O(h, g). Order O(g, h) defines how the paths will be spread apart from each other at the g side of the edge (g, h). Order O(h, g) defines how the paths will be spread apart from each other at the h side of the edge (g, h). More specifically, in one manner of interpretation, the order O(g, h) defines the order of the paths at the g side of the edge (g, h), from the left to right, from the perspective of a direction of travel from vertex g to vertex h. The order O(h, g) defines the order of the paths at the h side of the edge (g, h), from the left to right, from the perspective of a direction of travel from vertex h to vertex g. In one implementation, the order O(g, h) may be defined as the opposite of the order of O(h, g). From a high-level standpoint, the edge ordering module 110 determines the orders of the paths that will minimize path crossings. In one case, the edge ordering module 110 makes the assumption that any two paths have only one common subpath.

In one implementation, the edge ordering module 110 can perform block 1604 as follows. The edge ordering module 110 chooses an edge (g, h) and attempts to determine the path order O(g, h) at the h side of that edge. For example, first, the edge ordering module 110 can follow paths A and B along their common subpath in the direction of g to h, attempting to find a juncture at which path A diverges from path B (referred to as a forking vertex herein). Assume that, instead of finding that juncture, the edge ordering module 110 encounters a vertex at which an order O(g', h') of the paths has already been defined (e.g., in a previous iteration of the procedure 1902). If such a pre-established order O(g', h') is found, the edge ordering module 110 uses that order O(g', h') to define the order of O(g, h); the order O(h, g) is then the opposite of the order (g', h'). Otherwise, if a forking vertex is found first, the edge ordering module 110 defines the orders O(g, h) and O(h, g) based on how the paths diverge at this juncture. For example, if A forks to the left of B at the forking vertex (from the perspective of a direction of travel from vertex g to vertex h), then the order O(g, h) is defined as A<B, and the order O(h, g) is defined as A>B. If the forking vertex in the direction of g to h is not found, then the edge bundling module 110 repeats the above-described process in the opposite direction along the common subpath.

In summary, block 1604 indicates that the edge ordering module 110 determines the ordering of paths for each edge (g, h) by following a common subpath (to which edge (g, h) belongs) to detect a constraint which defines the ordering. That constraint may be either a juncture at which a prior-established ordering has been defined or a juncture at which the paths diverge from each other.

Figure 17:
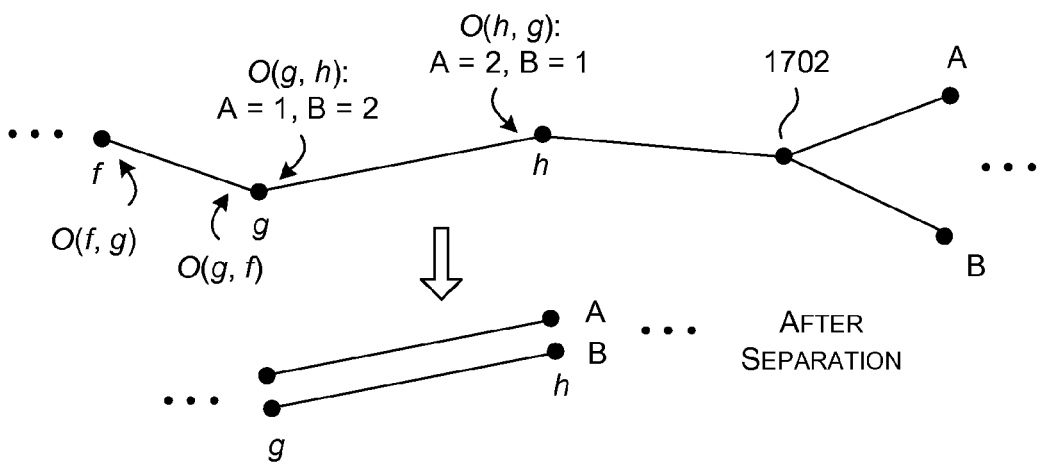
FIG. 17 shows two bundled paths for use in demonstrating one manner of operation of the procedure of FIG. 16.

Consider the example of FIG. 17 to illustrate the above concepts. An edge (g, h) is part of a common subpath shared by two paths, A and B. In an attempt to define the order O(g, h) for this edge (g, h), the edge ordering module 110 first follows the path in the direction of g to h. Assume that it eventually encounters a forking vertex 1702 at which the path A branches to the left of path B (from the perspective of the direction of travel from g to h). As stated above, this means that the order O(g, h) is defined as A<B, and the order O(h, g) is defined as A>B. These orderings determine how the edges are separated in the next phase of processing. For example, at the g side of the edge (g, h), the edge separating module 112 will move edge A to the left with respect to the edge B (from the perspective of the direction of travel from g to h). At the h side of the edge (g, h), the edge separating module 112 will move edge B to the left of edge A (from the perspective of the direction of travel from h to g).

The above procedure is repeated for each edge in the bundled graph. For example, consider the edge (f, g) which shares a vertex (vertex g) with the edge (g, h). The edge ordering module 110 determines the order O(f, g) of paths at f side of the edge (f, g) and the order O(g, f) of paths at g side of the edge (f, g).

In another example, suppose a graph includes edges (q, r) and (r, s). Further assume that A and B are paths passing through these edges. If the order of A and B in O(r, q) is the same as their order in O(r, s), then the path cross each other at vertex r.

D. The Edge Separating Module

Figure 18:
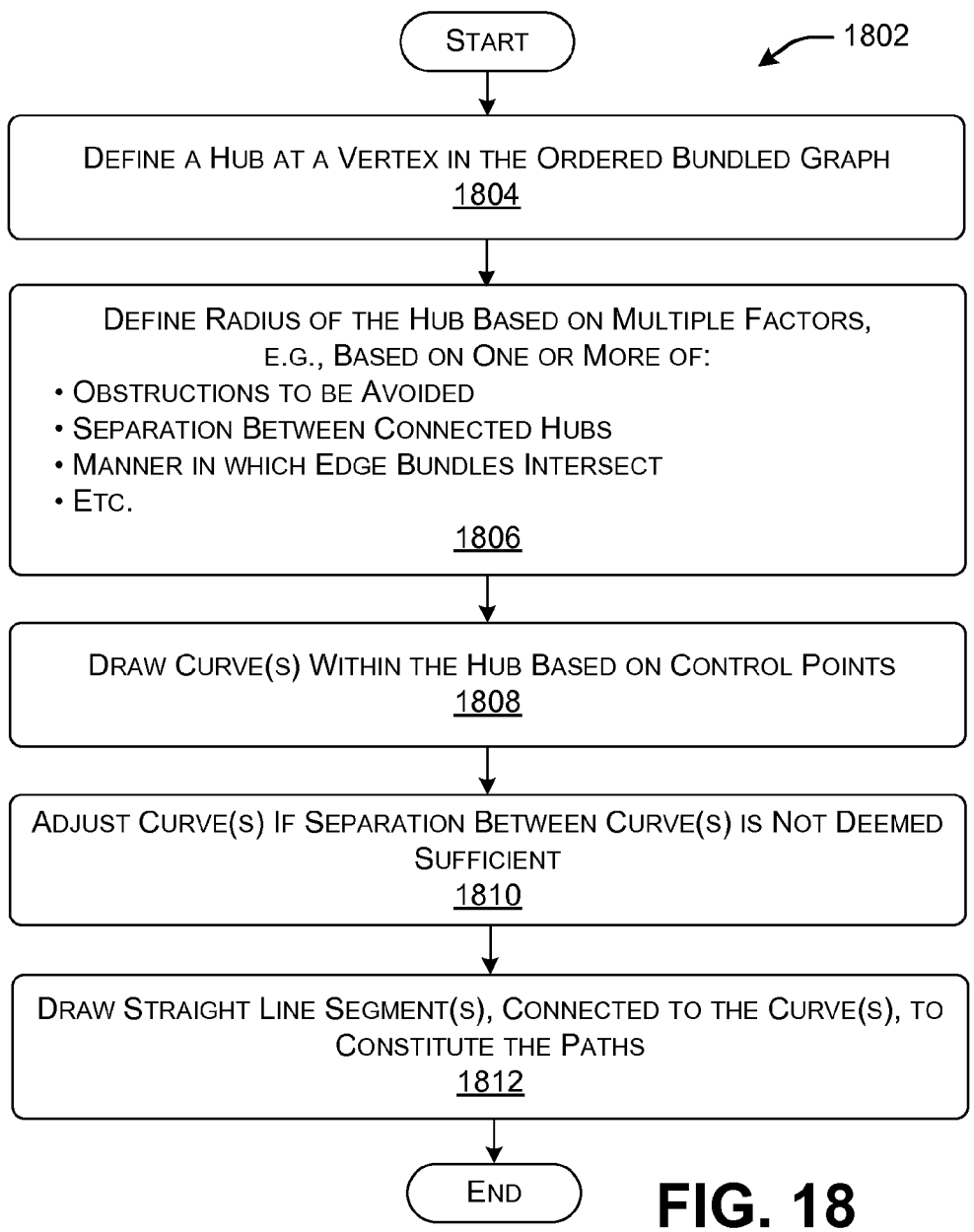
FIG. 18 shows an illustrative procedure that sets forth one manner of operation of an edge separating module of the graph processing module shown in FIG. 1.

FIG. 18 shows an illustrative procedure 1802 that sets forth one manner of operation of the edge separating module 112 of FIG. 1. To repeat, the purpose of this module is to separate the edges in the ordered bundled graph produced by the edge ordering module 110. This allows a user to trace individual paths in the resultant processed graph. More specifically, the procedure 1802 will be set forth with respect to a single vertex in the ordered bundled graph. The same operations can be performed with respect to the other vertices in the ordered bundled graph. Certain functions performed by the edge separating module 112 can performed after the edge bundling module 108 and edge ordering module 110 have done their work; other operations of the edge separation module 112 (such as the definition of hub radii) can be performed in conjunction with the operation of other modules, such as the edge bundling module 108.

In block 1804, the edge separating module 112 defines a hub, centered at a vertex. The hub corresponds to a circle or other shape which defines a locus at which the directions of paths passing through the vertex can change direction (or not change direction in some instances). Hence, the hub can contain one or more curved-line segments. Consider, for example, FIG. 19, which shows a hub 1902 that is associated with a particular vertex. It includes at least one curved-line segment 1904. A first linear segment 1906 is connected to one end of the curved-line segment 1904. A second linear segment 1908 is connected to the other end of the curved-line segment 1904. Each linear segment, in turn, may lead to another hub associated with another vertex (or it may lead to a terminal vertex associated with a node object).

Figure 19:
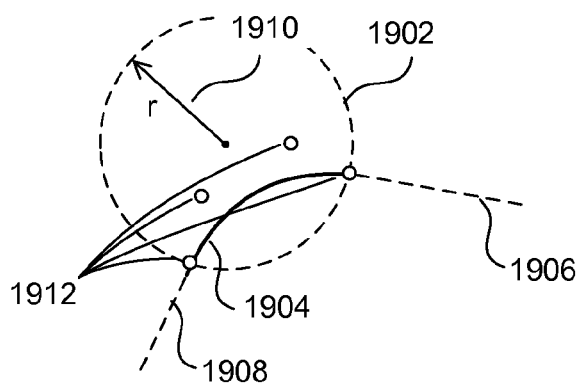
FIG. 19 shows an illustrative hub, for use in illustrating one manner in which curved-line segments can be drawn using the procedure of FIG. 18.

In block 1806, the edge separating module 112 defines a radius of the hub, such as radius 1910 of the hub 1902 shown in FIG. 19. The edge separating module 112 defines the radius based on multiple factors. Some of the factors push the edge separating module 112 towards a decision to increase the radius of the hub, while others factors push the edge separating module 112 in the opposite direction (towards a decision to decrease the radius of the hub). Hence, the radius chosen by the edge separating module 112 represents a tradeoff among potentially competing factors.

Figure 20:
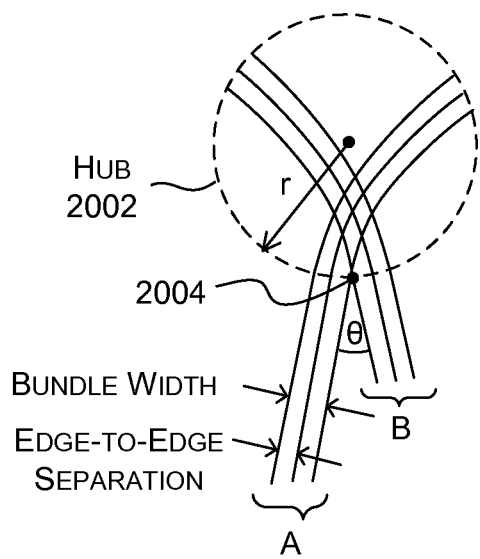
FIGS. 20 and 21 depict various constraints which govern the selection of a hub radius in the procedure of FIG. 18.
Figure 21:
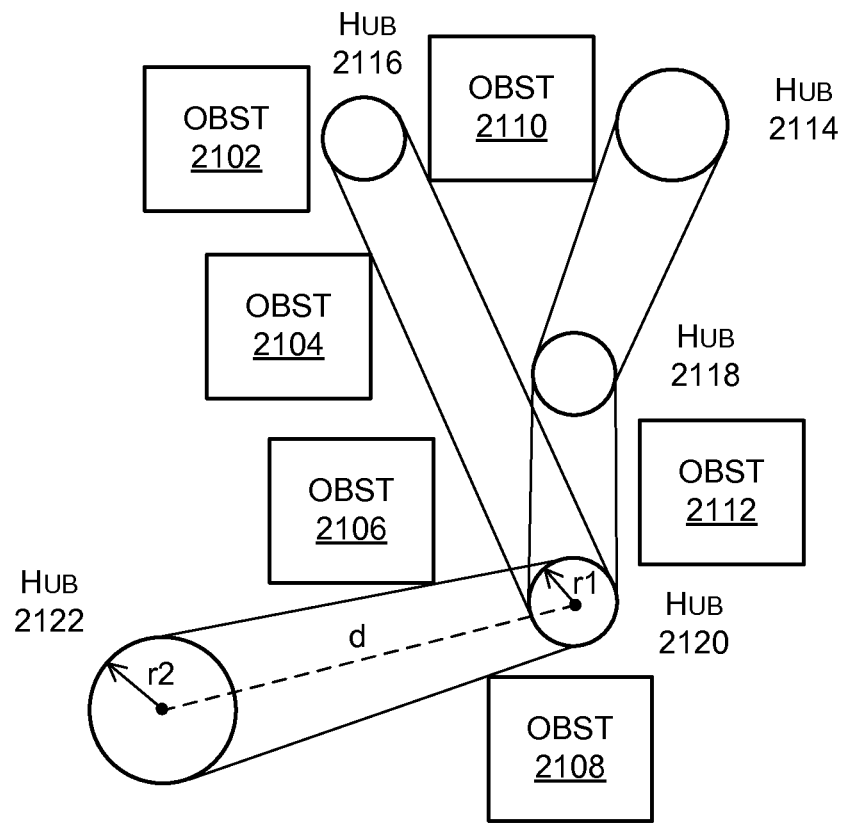

FIGS. 20 and 21 graphically illustrate some of the factors which may play a part in the selection of the radius. For example, consider the hub 2002 shown in FIG. 20. Two collections of edge bundles intersect at this hub 2002, namely edge bundle A and edge bundle B. In one implementation, the edge separating module 112 attempts to choose the radius of the hub 2002 to correspond to the point which these two edge bundles begin to cross, e.g., at point 2004. This point, in turn, depends on a number of factors, such as the width of each edge bundle and the angle at which the edge bundles (A and B) intersect. The width of each edge bundle, in turn, depends on a number of edges in the edge bundle, a desired separation between neighboring edges in the edge bundle, and a thickness of each individual edge in the edge bundle.

As a result of the radius-selection rule described above, the edge separating module 1112 will increase the radius approximately in inverse proportion to the angle formed between intersecting edge bundles. In the case of narrow-angle intersections, this produces large-radius curvatures of paths within the hub. This effect, in turn, reduces the type of path-crossing ambiguity explained above with respect to portions 402 and 404 of the original graph (in FIG. 4).

Advancing to FIG. 21, this figure demonstrates additional constraints which influence the size of a radius of a hub. Namely, this figure shows six obstacles (obstacles 2102-2112) associated with rectangular node objects. The figure also shows five hubs (hubs 2114-2122) associated with respective vertices. Each hub is selected to be small enough (if possible) such that its perimeter does not interfere (e.g., cross into) any of the obstacles (2102-2112). Each hub is also selected to be small enough (if possible) such that the path segments which emanate from the hub do not interfere with any of the obstacles (2102-2112).

As another constraint, the edge separating module 112 chooses the size of each hub so that it is a sufficient distance from any other hub to which it is connected. For example, the hub 2120 includes at least one path which connects it to the hub 2122. A distance d separates the hub 2120 from the hub 2122. The edge separating module 112 specifies that the radius of the hub 2120 (r1) plus the radius of the second hub 2122 (r2) is expected to be less than or equal to some multiplier β of the distance d, e.g., r1+r2≤βd, where β is any implementation-specific positive parameter smaller than 1 (selected so that the hubs do not intersect each other).

In summary then, block 1806 indicates that the edge separating module 112 determines the radius of each hub based on one or more of: (a) obstructions to be avoided (as shown in FIG. 21); (b) the separation between connected hubs (as shown in FIG. 21); and (c) the manner in which edge bundles intersect (as shown in FIG. 20). In some cases, the demands of one consideration cannot be fully met in view of the demands of one or more other considerations. In that situation, the edge separating module 112 can select a radius which partially satisfies each of the conflicting considerations.

In block 1808, the edge separating module 112 draws one or more curved-lined segments ("curves") in the hub that has been defined in block 1806. In one case, the edge separating module 112 generates each curved-line segment as a parameterized curved-line segment, such as a Bézier segment. A Bézier segment is defined with respect to a collection of control points, such as the control points 1912 shown in FIG. 19. For example, a quadratic Bézier segment is defined with respect to three control points, while a cubic Bézier segment is defined with respect to four control points. FIG. 19, for instance, shows the use of a cubic Bézier segment that is defined with respect to four control points 1912. The Bézier segment does not intersect the two middle control points, but these control points otherwise influence the path of the Bézier segment. According to one feature, all of the control points are selected so that they are encompassed by the hub circle (perimeter). This means that Bézier segment itself, which is defined by the control points, will also be entirely enclosed by the hub circle.

In the case in which the hub contains plural parameterized curved-line segments, the edge separating module 112 attempts to draw the curved-lined segments so that they are separated from their respective neighboring curved-line segments by at least a minimum separation distance (at every point along the curved-line segments). In block 1810, if this goal is not achieved, the edge separating module 112 adjusts the positions of one or more parameterized curved-line segments, e.g., by adjusting the position(s) of the control point(s) of the segment(s).

Figure 22:
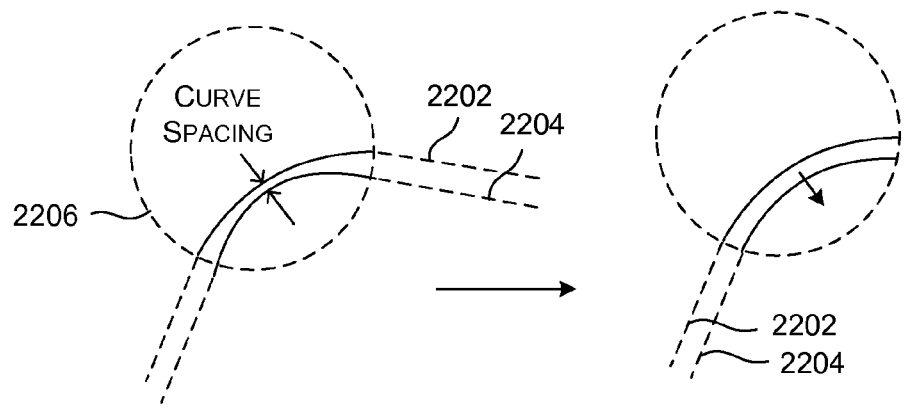
FIG. 22 shows an illustrative hub, depicting an adjustment of a curved-line segment using the procedure of FIG. 18.

FIG. 22 provides additional details of one possible implementation of block 1810 of FIG. 18. In this example, two paths (2202 and 2204) pass through a hub 2206. As indicated at the left part of the figure, the curved-line segments associated with these paths (2202, 2204) are not separated by a minimum separation at all points along the segments. To address this situation, the edge separating module 112 adjusts the control points of the outermost curved-line segment (associated with path 2204), thereby moving it away from the other curved-line segment (associated with path 2202). The right portion of FIG. 22 illustrates the end result of this adjustment. In effect, the movement of the control points in this manner makes the outermost curved-line segment more linear compared to its original shape.

Returning to FIG. 18, in block 1812, the edge separating module attaches linear segments to the curved-line segments created in block 1810. Alternatively, the block 1812 can precede the block 1810.

Figure 23:
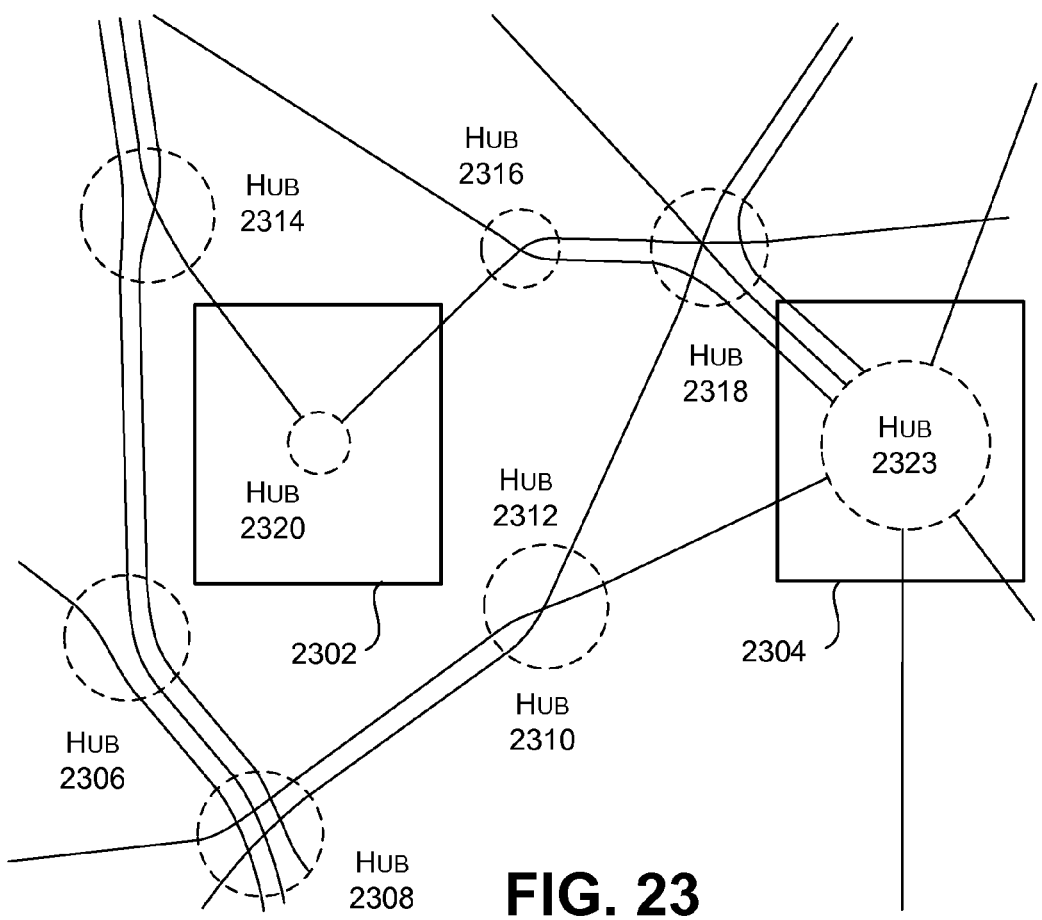
FIG. 23 shows a portion of a processed graph that is constructed using hubs, based on the procedure of FIG. 18.

Finally, FIG. 23 illustrates a sample of a processed graph produced by the edge separating module 112 using the procedure 1802 of FIG. 18. That processed graph includes at least two obstacles (2302 and 2304), together with a collection of hubs (2306-2324). Curved-line segments appear within the hubs (2306-2324). Linear segments are connected to the respective ends of the curved-line segments. Although not demonstrated in FIG. 23, further note that some of the paths can be entirely drawn using single respective linear segments (as shown in FIG. 5).

E. Representative Processing Functionality

FIG. 24 sets forth illustrative electrical computing functionality 2400 that can be used to implement any aspect of the functions described above. For example, the computing functionality 2400 can be used to implement any aspect of the graph processing module 102 of FIG. 1. In one case, the computing functionality 2400 may correspond to any type of computing device that includes one or more processing devices. In all cases, the electrical data computing functionality 2400 represents one or more physical and tangible processing mechanisms.

The computing functionality 2400 can include volatile and non-volatile memory, such as RAM 2402 and ROM 2404, as well as one or more processing devices 2406 (e.g., one or more CPUs, and/or one or more GPUs, etc.). The computing functionality 2400 also optionally includes various media devices 2408, such as a hard disk module, an optical disk module, and so forth. The computing functionality 2400 can perform various operations identified above when the processing device(s) 2406 executes instructions that are maintained by memory (e.g., RAM 2402, ROM 2404, or elsewhere).

More generally, instructions and other information can be stored on any computer readable medium 2410, including, but not limited to, static memory storage devices, magnetic storage devices, optical storage devices, and so on. The term computer readable medium also encompasses plural storage devices. In all cases, the computer readable medium 2410 represents some form of physical and tangible entity.

The computing functionality 2400 also includes an input/output module 2412 for receiving various inputs (via input modules 2414), and for providing various outputs (via output modules). One particular output mechanism may include a presentation module 2416 and an associated graphical user interface (GUI) 2418. Another possible output mechanism is a printer (not shown). The computing functionality 2400 can also include one or more network interfaces 2420 for exchanging data with other devices via one or more communication conduits 2422. One or more communication buses 2424 communicatively couple the above-described components together.

The communication conduit(s) 2422 can be implemented in any manner, e.g., by a local area network, a wide area network (e.g., the Internet), etc., or any combination thereof. The communication conduit(s) 2422 can include any combination of hardwired links, wireless links, routers, gateway functionality, name servers, etc., governed by any protocol or combination of protocols.

In closing, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed using one or more hardware processors in conjunction with a computer-readable medium, for producing a processed graph, the method comprising:

receiving an original graph that expresses a set of nodes and a set of relationships among respective pairs of nodes;

selecting, using at least one of the hardware processors, edges to constitute paths, so as to produce a bundled graph, the paths being associated with respective relationships expressed by the original graph;

said selecting comprising minimizing a cost function that is expressed as a sum of contributions to the cost function, the contributions including:

(a) a contribution of an ink component which defines a collective length of edges used to draw the paths in the bundled graph; and (b) a contribution of a summed-path component which defines a sum of weighted lengths of the paths in the bundled graph, the weighted lengths weighted by weighting parameters which modify the respective lengths;

ordering, using at least one of the hardware processors, paths in the bundled graph to produce an ordered bundled graph;

separating, using at least one of the hardware processors, edges in the ordered bundled graph to produce the processed graph;

storing the processed graph; and providing a visual rendering of the processed graph on an output device.

2. The method of claim 1, wherein the cost function is expressed as: $\alpha^* \text{ink} + K^* \Sigma_{uv \in P} w_{uv} l_{uv}$, where:

ink is the ink component;

$\alpha$ is a coefficient which determines the contribution of the ink component to the cost function;

$\Sigma_{uv \in P} w_{uv} l_{uv}$ is the summed-path component;

K is a coefficient which determines the contribution of the summed-path component to the cost function;

uv is a path in the bundled graph between a node u and a node v, which is a member of a set of paths P;

$l_{uv}$ is a length of the path uv; and $w_{uv}$ is a weighting parameter which modifies the length $l_{uv}$.

3. The method of claim 2, wherein the weighting parameter $w_{uv}$ comprises an inverse ratio of an Euclidean distance between the node u and the node v.

4. The method of claim 1, wherein said selecting comprises minimizing the cost function on a path-by-path basis.

5. The method of claim 1, wherein said selecting comprises:

establishing, based on the original graph, a candidate-edge graph which provides a plurality of vertices that define a plurality of candidate edges, wherein said selecting is performed on the candidate-edge graph by selecting candidate edges in the candidate-edge graph to construct the paths in the bundled graph.

6. The method of claim 5, wherein the candidate-edge graph is a visibility graph.

7. The method of claim 5, further comprising adjusting positions of vertices in the bundled graph to straighten paths in the bundled graph.

8. The method of claim 7, wherein said adjusting comprises incrementally adjusting the vertices in the bundled graph so as to:
reduce the cost function; and
avoid obstacles defined by the candidate-edge graph.

9. The method of claim 5, wherein said ordering comprises:
defining an ordering of a collection of paths in the bundled graph for at least one edge in the bundled graph, that edge being a part of a common subpath, and wherein the collection of paths pass through that common subpath,
said defining being constrained by at least one of: a juncture in the subpath at which an ordering has been previously established for the collection of paths; or a juncture in the subpath at which the collection of paths in the bundled graph diverge from each other.

10. The method of claim 5, wherein said separating comprises:
defining a hub for at least one vertex of at least one path in the ordered bundled graph; and
selecting a radius of the hub based on consideration of one or more of:
obstructions to be avoided in the ordered bundled graph;
a minimum permitted separation between connected hubs; and
a manner in which edges impinge the hub.

11. The method of claim 10, further comprising:
drawing at least one curved-line segment within the hub; and
drawing at least one at least one linear segment that is connected to said at least one curved-line segment.

12. The method of claim 11, further comprising adjusting said at least one curved-line segment if said at least one curved-line segment is not separated from a neighboring curved-line segment within the hub by a predetermined minimum separation.

13. A system comprising: one or more hardware processors; and
a computer readable medium storing computer readable instructions that, when executed, cause the one or more processors to:
generate a processed graph, the generating including:
receiving an original graph that expresses a set of nodes and a set of relationships among respective pairs of nodes;
establishing, based on the original graph, a candidate-edge graph which provides a plurality of vertices that define a plurality of candidate edges, and
selecting candidate edges from the candidate-edge graph so as to constitute paths, to produce a bundled graph, the paths being associated with respective relationships expressed by the original graph;
said selecting comprising minimizing a cost function that is expressed as a sum of contributions to the cost function, the contributions including:
(a) a contribution of an ink component which defines a collective length of candidate edges used to draw the paths in the bundled graph; and
(b) a contribution of a summed-path component which defines a sum of weighted path lengths of the paths in the bundled graph, the weighted lengths weighted by weighting parameters which modify the respective lengths;
ordering paths in the bundled graph to produce an ordered bundled graph;
separating edges in the ordered bundled graph to produce the processed graph;
store the processed graph; and
provide a visual rendering of the processed graph on an output device.

14. The system of claim 13, wherein the cost function is expressed as: $\alpha*\text{ink}+K*\Sigma_{uv\in P}w_{uv}l_{uv}$, where:
ink is the ink component;
$\alpha$ is a coefficient which determines the contribution of the ink component to the cost function;
$\Sigma_{uv\in P}w_{uv}l_{uv}$ is the summed-path component;
K is a coefficient which determines the contribution of the summed-path component to the cost function;
uv is a path in the bundled graph between a node u and a node v, which is a member of a set of paths P;
$l_{uv}$ is a length of the path uv; and
$w_{uv}$ is a weighting parameter which modifies the length $l_{uv}$.

15. The system of claim 14, wherein the weighting parameter comprises an inverse ratio of an Euclidean distance between the node u and the node v.

16. The system of claim 13, wherein said selecting comprises minimizing the cost function on a path-by-path basis.

17. The system of claim 13, wherein said selecting further comprises adjusting positions of vertices in the bundled graph to straighten paths in the bundled graph.

18. A system for producing a processed graph, the system comprising:
one or more hardware processors; and
a computer-readable medium storing computer readable instructions that, when executed, cause the one or more hardware processors to:
produce the processed graph, the producing including:
selecting edges that constitute paths, to produce a bundled graph, the paths being associated with respective relationships expressed by an original graph, and
ordering paths in the bundled graph to produce an ordered bundled graph,
the ordering including defining an ordering of respective paths of a collection of paths in the bundled graph for at least one edge in the bundled graph, that edge being a part of a common subpath, and the respective paths of the collection of paths passing through that common subpath,
said defining the ordering of the respective paths of the collection of paths in the bundled graph for the at least one edge in the bundled graph being constrained by a juncture in the subpath at which an ordering has been previously established for the collection of paths;
store the processed graph; and
provide a visual rendering of the processed graph on an output device.

19. The system of claim 18, wherein the computer readable instructions, when executed, cause the one or more hardware processors to separate edges in the ordered bundled graph to produce the processed graph,
the separating comprising defining a plurality of hubs at respective vertices in the ordered bundled graph, each hub containing at least one parameterized curved-line segment that connects together one or more linear segments.

20. The system of claim 19, wherein said separating includes selecting a radius of the hub based on one or more of:
obstructions to be avoided in the ordered bundled graph;
a minimum permitted separation between hubs; and
a manner in which edges impinge the hub.

* * * * *